US006304347B1

(12) United States Patent
Beine et al.

(10) Patent No.: US 6,304,347 B1
(45) Date of Patent: Oct. 16, 2001

(54) OPTICAL POWER MANAGEMENT IN AN OPTICAL NETWORK

(75) Inventors: Todd Beine, Los Gatos; Paul Mitalas, Sunnyvale; Brian Pheiffer, Santa Clara; Denis Zaccarin, Sunnyvale; Michael E. Durling, Los Gatos; Hon Wah Chin, Palo Alto, all of CA (US)

(73) Assignee: ONI Systems Corporation, San Jose, CA (US)

( * ) Notice: Subject to any disclaimer, the term of this patent is extended or adjusted under 35 U.S.C. 154(b) by 0 days.

(21) Appl. No.: 09/653,628

(22) Filed: Sep. 1, 2000

Related U.S. Application Data

(60) Provisional application No. 60/166,278, filed on Nov. 18, 1999, and provisional application No. 60/152,480, filed on Sep. 3, 1999.

(51) Int. Cl.$^7$ .................................................. H04B 10/08
(52) U.S. Cl. .............................................. 359/110; 359/118
(58) Field of Search ............................... 359/118, 171, 359/124, 110

(56) References Cited

U.S. PATENT DOCUMENTS 5,623,355  4/1997  Olsen ................................. 359/110
5,808,760  9/1998  Gfeller .............................. 359/110
6,233,235 * 5/2001  Burke et al. ....................... 370/356

FOREIGN PATENT DOCUMENTS 3-104434(A)  5/1991  (JP) .

* cited by examiner

Primary Examiner—Kinfe-Michael Negash
(74) Attorney, Agent, or Firm—Townsend and Townsend and Crew LLP

(57) ABSTRACT

A system for managing signal power levels in an optical network. The optical network comprises a plurality of nodes having logic to receive and transmit optical signals over a plurality of network interconnections. The system includes a method wherein each of the nodes is provided configuration parameters, each of the nodes is configured based on the configuration parameters, power parameter information is exchanged between the nodes, at least some of the nodes are re-configured based on the power parameter information and the steps of exchanging power parameter information and re-configuring at least some of the nodes are repeated until the optical network is fully configured so that the optical signals have selected signal power levels.

45 Claims, 25 Drawing Sheets

| | Normal | Ring Switch | Ring Switch Pass thru | Equipment Switch | Other |
|---|---|---|---|---|---|
| Input level | -3 dBm | -2 dBm | -3 dBm | -4 dBm | -3 dBm |
| Output level | -6 dBm | -5 dBm | -6 dBm | -7 dBm | -6 dBm |
| Internal Loss | -3 dBm | -3 dBm | -3 dBm | -3 dBm | -3 dBm |

*FIG. 5.*

| | Normal | Ring Switch | Ring Switch Pass thru | Equipment Switch | Other |
|---|---|---|---|---|---|
| 718 — Number of Wavelengths | 3 | --- | --- | --- | --- |
| 712 — Internal level | -3 dBm | --- | --- | --- | --- |
| 714 — Output level | -6 dBm | --- | --- | --- | --- |
| 716 — Internal Loss | -3 dBm | -3 dBm | -3 dBm | -3 dBm | -3 dBm |

FIG. 7.

NODE 208

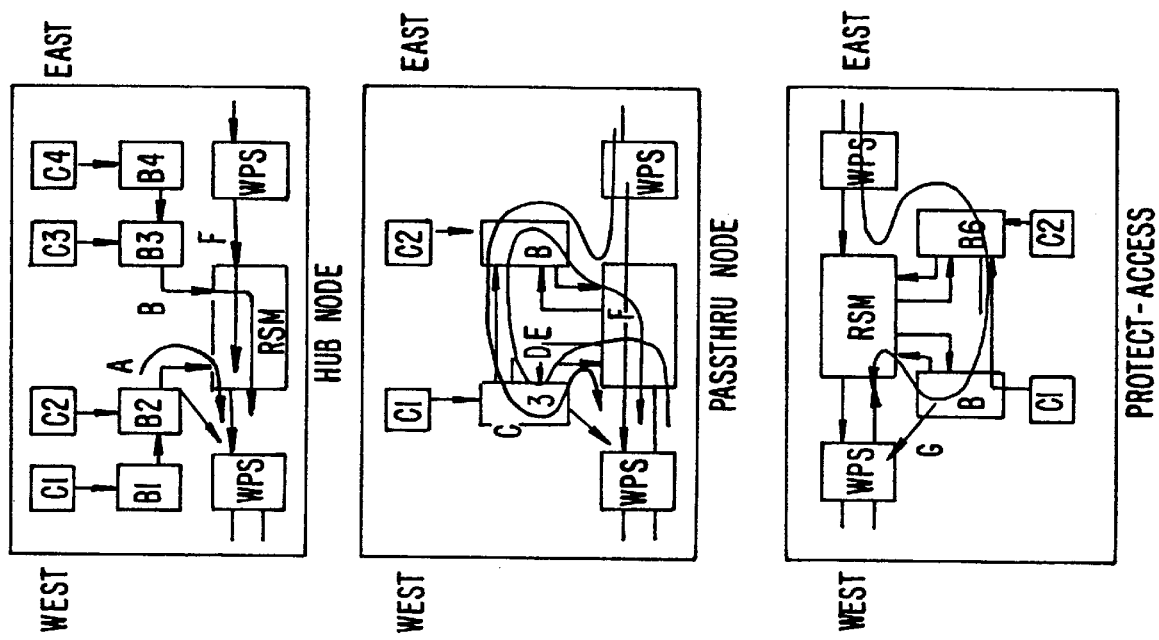

A (working added same side, normal)
B (working added opposite, ring protect switch)
C (working passthru, normal)
D (protect to working, ring protect switch)
E (working to protect, ring protect switch)
F (protect passthru, ring protect passthru)
G (protect-access add same side)
H (protect-access passthru)
I (working add same side, equip protect)
J (working passthru, equip protect)

The configurations of these paths differ between open and passthru nodes.

$WPS_{output} = MIN(A, B, C, D, E, F, G, H, I, J)$

FIG. 19.

OPTICAL POWER MANAGEMENT IN AN OPTICAL NETWORK

CROSS-REFERENCES TO RELATED APPLICATIONS

This application claims priority from co-pending U.S. Provisional Patent Application No. 60/152,480 filed Sep. 3, 1999, the disclosure of which is incorporated in its entirety herein by reference for all purposes. This application also claims priority from co-pending U.S. Provisional Patent Application 60/166,278 filed Nov. 18, 1999, the disclosure of which is incorporated in its entirety herein by reference for all purposes.

FIELD OF THE INVENTION

The present invention relates generally to information networks, and more particularly, to the configuration and operation of an optical network.

BACKGROUND OF THE INVENTION

In an optical network, it is essential that each network element be able to transport a large number of optical signals that may have varying power levels. This is required because signal power levels dynamically change as signals are switched and routed throughout the network.

In a two fiber optical bidirectional line-switched ring (OBSLR) network, working and protect channel pairs are routed around the network. As a result of network switching events, the working and protect channels may be routed on different signal paths, with each signal path having a different loss characteristic. Thus, it is possible that at any given point in the network, a working and protect channel pair can have different signal power levels. This situation can result in increased bit error rates (BER) on the lower power channel.

FIG. 1 illustrates how path variations due to typical network switching events can result in power level variations between working and protect channel pairs. A working path contains two channels, 1 and 2, with individual channel power of A as shown at 102. The protect path has two channels, 3 and 4, with individual channel power of A as shown at 104. In a typical system, the working and protect channels may be routed via different signal paths that have different signal loss characteristics. As a result of the different routing paths, the working and protect channels may have different signal power levels at some point in the network as shown at 106. For example, after being routed via one path, channels 1 and 2 have channel power of B; and after being routed via another path, channels 3 and 4 have channel power of C. After being multiplexed together, the channels still maintain their respective channel power levels, and have a power level differential as shown at 108. The power level differential 108 between the working and protect channels may result in excessive BERs, since the lower power channels may have a signal level that is too low to be adequately transmitted and received on the network.

In addition to the signal loss associated with different routing paths, the power level differential 108 between the working and protect channels may increase when the signals are amplified. For example, the aggregate channels, as shown at 106, may be input to an amplifier that experiences saturation effects caused by the relatively high power level of channels 1 and 2. The saturation effects may result in non-linear amplification which may increase the amplitude differential 108 to cause the resulting amplified signals to appear as shown at 110. Due to the saturation effects of the amplifier, channels 1 and 2 receive greater amplification than channels 3 and 4. Thus, channels 1 and 2 have channel power of D, and channels 3 and 4 have channel power of E. The resulting increased power level differential is shown at 112. This large power differential contributes to increased BERs as the signals are further switched and transmitted around the optical network.

In typical optical networks, each node may be manually configured to operate in accordance with intended signal routing in the network. For example, preset attenuation pads, having a fixed attenuation value, are inserted in signal transmission paths to set signal attenuation around the network.

In addition to the problems associated with path loss and amplifier saturation, manually configuring each node in an optical network presents a number of additional problems. First, manually configuring each node is prone to errors. Thus, if a node is configured improperly, it must be manually reconfigured again thereby adding costs. Second, each node must be engineered per site. This means that the nodes are not identically configured, and therefore each node must be customized. Third, it is difficult to upgrade any network components. For example, upgrading a component in a node may affect other components in the node. Changing a node may affect adjacent nodes. Thus, upgrades and maintenance for manually configured networks is difficult and expensive. Fourth, it is difficult to add nodes to an existing network, since the added node and each node it affects must be manually configured. For example, manual configuration may require nodes to be added in a specific sequence or introduce a limitation on the number of new nodes that may be added. Finally, the network may become unstable if due to signal routing or switching events, the signal levels are not as anticipated when the manual configuration occurred. For example, if signal power levels change as a result of a network switching event, the initial manual configuration of a network element may result in that element being unable to handle the new signal power levels.

SUMMARY OF THE INVENTION

The present invention provides a system for managing signal power levels in an optical network. In one power management strategy provided by the invention, a consistent output power per wavelength is maintained between neighboring network elements in a OBSLR network. Consistent means that the signal power level between network elements will not change significantly enough, over any switching condition in the network, to affect the ability of the network to carry traffic. This localizes power management within each node since input power levels to the nodes remain constant. As a result, power management for the network becomes a function of each node's internal component configuration and optical path variations. In this strategy all switching scenarios are folded into a small set of operating modes.

In another power management strategy provided by the invention, signal power parameters for different network switching scenarios are tracked. Thus, it is possible to optimize the available signal-to-noise ratio (SNR) in the network at the cost of calculating, storing and exchanging signal power parameters around the optical network.

In another power management strategy provided by the invention, signal power parameters for different network switching scenarios are pre-computed and stored. The pre-computed values provide a way for network elements to quickly react to switching events without necessarily having to re-compute parameters as each event occurs.

In an embodiment of the present invention, a method for managing signal power levels in an optical network is provided. The optical network comprises a plurality of nodes having logic to receive and transmit optical signals over a plurality of network interconnections. The method comprising steps of: providing each of the nodes configuration parameters; configuring each of the nodes based on the configuration parameters; exchanging power parameter information between the nodes; re-configuring at least some nodes based on the power parameter information; and repeating the steps of exchanging and re-configuring until the optical network is fully configured so that the optical signals have selected signal power levels.

BRIEF DESCRIPTION OF THE DRAWINGS

FIG. 5 shows a parameter table for use with the first type of internal component shown in FIG. 4;

FIG. 7 shows a parameter table for use with the second type of internal component shown in FIG. 6;

FIG. 19 shows a diagram of routing paths through a network element;

DESCRIPTION OF THE SPECIFIC EMBODIMENTS

The power management strategy of the present invention provides a consistent output power per wavelength between neighboring network elements in a OBSLR network. Consistent means that the signal power level between network elements will not change significantly enough, over any switching condition in the network, to affect the ability of the network to carry traffic. This localizes power management within each node since input power levels to the nodes remain constant. As a result, power management for the network becomes a function of each node's internal component configuration and optical path variations.

In one embodiment of the invention, a method and apparatus are provided for provisioning cross-connections between internal components at each network element. As these inter-card connections are made, power management modules negotiate the input and output levels over each card interface. These levels are computed at each card from neighboring interface power levels and the optical path loss for the card and are stored in parameter tables. In this fashion, internal connections are used to automatically compute signal power levels at each point along an optical path through the network element. Thus, each network element can compute a constant output power level by analyzing the internal optical paths that result from protection (or switching) events. A protection event is an event wherein signals in the network are re-routed to their destinations to overcome network problems, such as damage or loss of a signal link between network elements. At any network element, the card provisioning accounts for protection events so that the worst-case output level is guaranteed over all network protection events.

In another embodiment of the invention, it is possible to track not just the worst case output levels, but individual scenarios associated with different network configurations having particular operating modes and optical paths. Although this may result in larger parameter tables to be accounted for, the best possible SNR for the overall network can be achieved.

Figure 1:
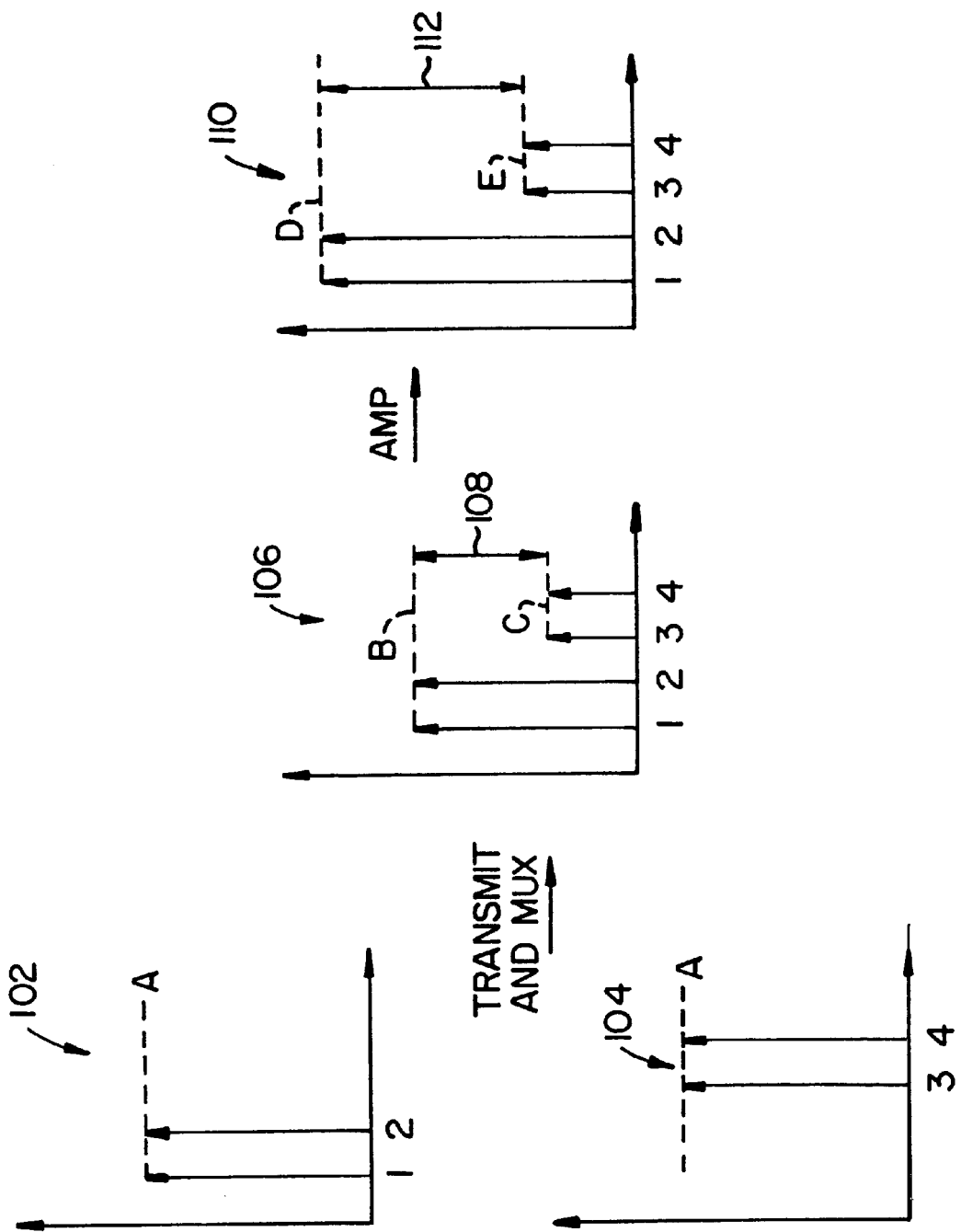
FIG. 1 illustrates how path variations due to typical network switching events can result in power level variations.
Figure 2:
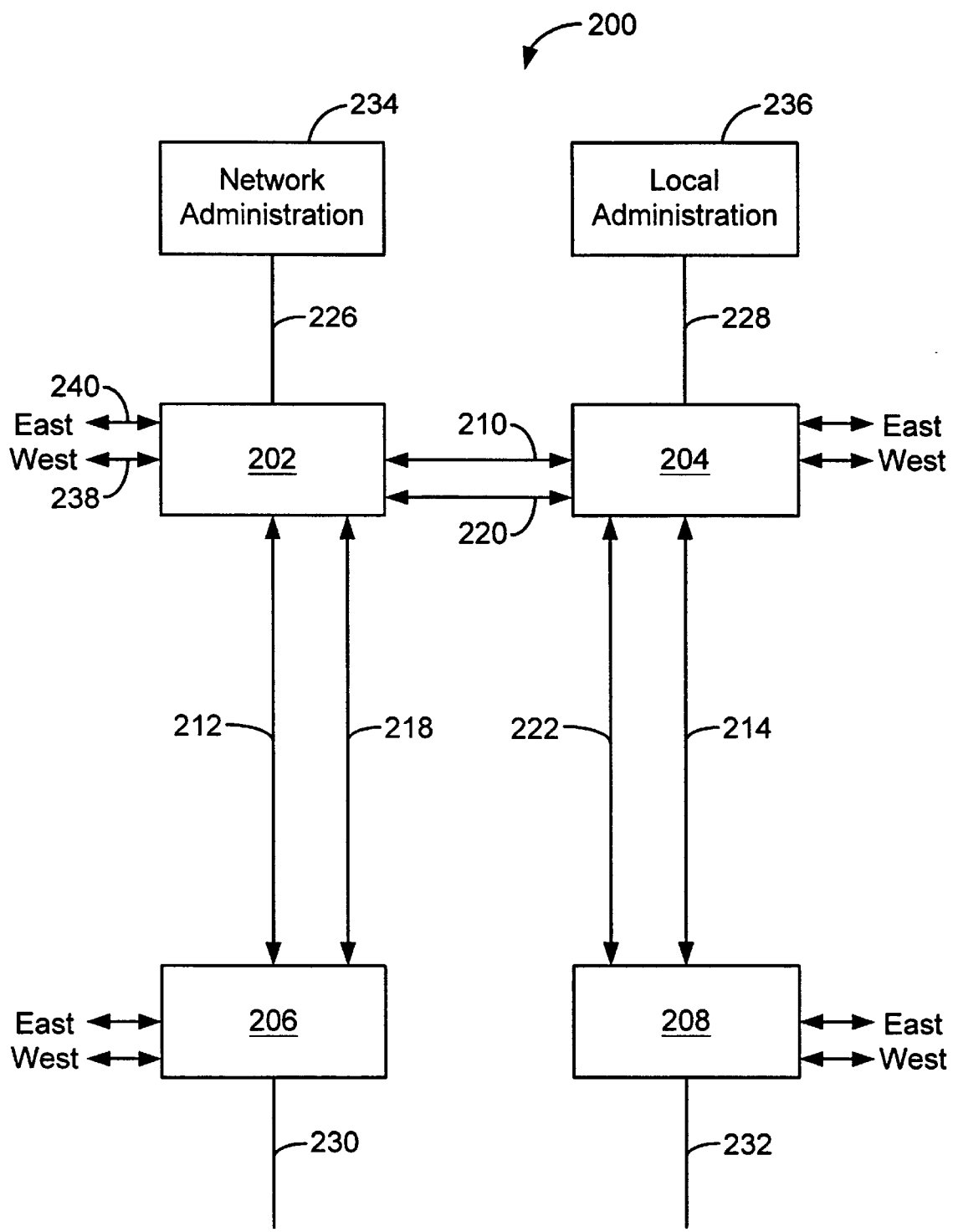
FIG. 2 shows a portion of an optical network constructed in accordance with the present invention.

FIG. 2 shows a block diagram of a portion of an optical network 200 constructed in accordance with the present invention. The optical network 200 will be used to demonstrate how power management is localized to the network elements in accordance with the present invention.

The network 200 comprises nodes or network elements (NE) 202, 204, 206 and 208. The nodes are interconnected by signal links 210, 212, 214 and 216. The signal links are used to transmit optical signals between the nodes. The signal links are shown as individual links but may comprise bidirectional transmission paths. For example, signal link 212 comprises a transmit signal path from node 202 to node 206 and a receive signal path from node 206 to node 202. Using the signal links, optical signals may be transmitted around the network over a variety of routing paths.

The nodes are also interconnected by information links 218, 220, 222 and 224. The information links are used to transmit information, such as administrative information or signal parameters, between the nodes. The information links and the signal links may be separate links or may be combined into one link that carries both signals and information. The information links form an Optical Supervisory Channel (OSC) which connects all the nodes in the optical network. Using the OSC, network elements provide information to each other about the signal levels of signals being transmitted over the optical network.

The nodes also have parameter inputs shown at 226, 228, 230 and 232. The parameter inputs are used to input configuration parameters to the nodes. The configuration parameters are used to configure internal components within the node and may be used to determine signal routing and/or signal power levels. Alternatively, a parameter input at one node can be used to input configuration parameters for multiple nodes, wherein the node receiving the configuration parameters distributes them to other nodes via the information links. The parameter inputs may be coupled to an information network, such as an Ethernet network, so that it is possible to download configuration parameters to the nodes via a remote network entity, such as a network administrator shown at 234. In addition, the parameter inputs may be coupled directly to local equipment, as shown at 236, to download configuration parameters directly to the nodes in a local mode of operation.

Each of the nodes has east and west signal links that are used to add or drop signals from the optical network. For example, west link 238 is used to add or drop signals that are transmitted over signal link 212 and east link 240 is used to add or drop signals that are transmitted over signal link 210.

In one embodiment of the present invention, the output signal powers of signals transmitted on the signal links between neighboring network elements are held at consistent output power per wavelength. This is accomplished utilizing specialized hardware and software at each network element. For example, the signal power levels associated with signals transmitted over signal link 210 from node 202 to node 204 are held at a consistent power level per wavelength by hardware and/or software located at node 202. Node 204, which receives these signals, also uses hardware and/or software of the present invention to transmit output signals having a consistent power level per wavelength over signal link 214 to node 208. As a result, network protection events will not change the signal power levels between neighboring nodes significantly enough to affect the ability of the network to carry traffic.

To accomplish power management at each node, a configuration process occurs wherein each network element provisions its internal components to determine output power as a function of network operating modes. For example, the network element may operate in a normal mode, where signals are routed through the element via one path, or the network element may operate in a ring switch mode, where signals are routed through the network element via another path. Each of the operating modes for the network element may result in a different routing path for network signals. Once provisioning of the internal components is complete, the network elements indicate their output power levels associated with various operating modes to neighbor nodes via the information links which form the OSC.

After the network elements receive information over the OSC regarding output power levels of neighbor nodes, each network element recalculates the power levels along its internal optical paths. An adjusted output power level may result from the recalculations. Information about the adjusted output power levels is exchanged between network elements over the OSC. Additional re-calculations occur if necessary. Thus, a continuous process occurs wherein a network element determines its output power level based on updated input power level indications received from neighbor elements over the OSC. Eventually, the network elements converge on a set of constant internode power levels.

Therefore, a method for performing power management in an optical network in accordance with the present invention would perform the following steps:

provisioning internal components of each network node as a function of network operating modes;

determining power parameters for each operating mode at each network node;

exchanging power parameters between adjacent connected network nodes;

updating the power parameters at each node based on the received power parameters; and repeating the steps of exchanging and updating until the nodes converge on a set of constant internode power levels.

In another embodiment of the present invention, the output signal powers of signals transmitted on the signal links are set to produce the best possible SNR for the overall network. To accomplish this, additional information parameters are exchanged between the nodes. The nodes use the additional information to compute SNR information associated with received signals. The nodes then perform internal power management calculations to determine how to adjust the received signals so as to achieve the best SNR when transmitting the signals to other nodes.

In another embodiment of the present invention, signal power parameters of signals transmitted on the signal links are pre-computed for some or all switching events that may occur in the network. These pre-computed parameters are then stored for future use. Therefore, instead of having to spend time re-computing power parameters as switching events occur, the pre-computed values can be used to allow the network elements to quickly adjust to accommodate network switching events.

Figure 3:
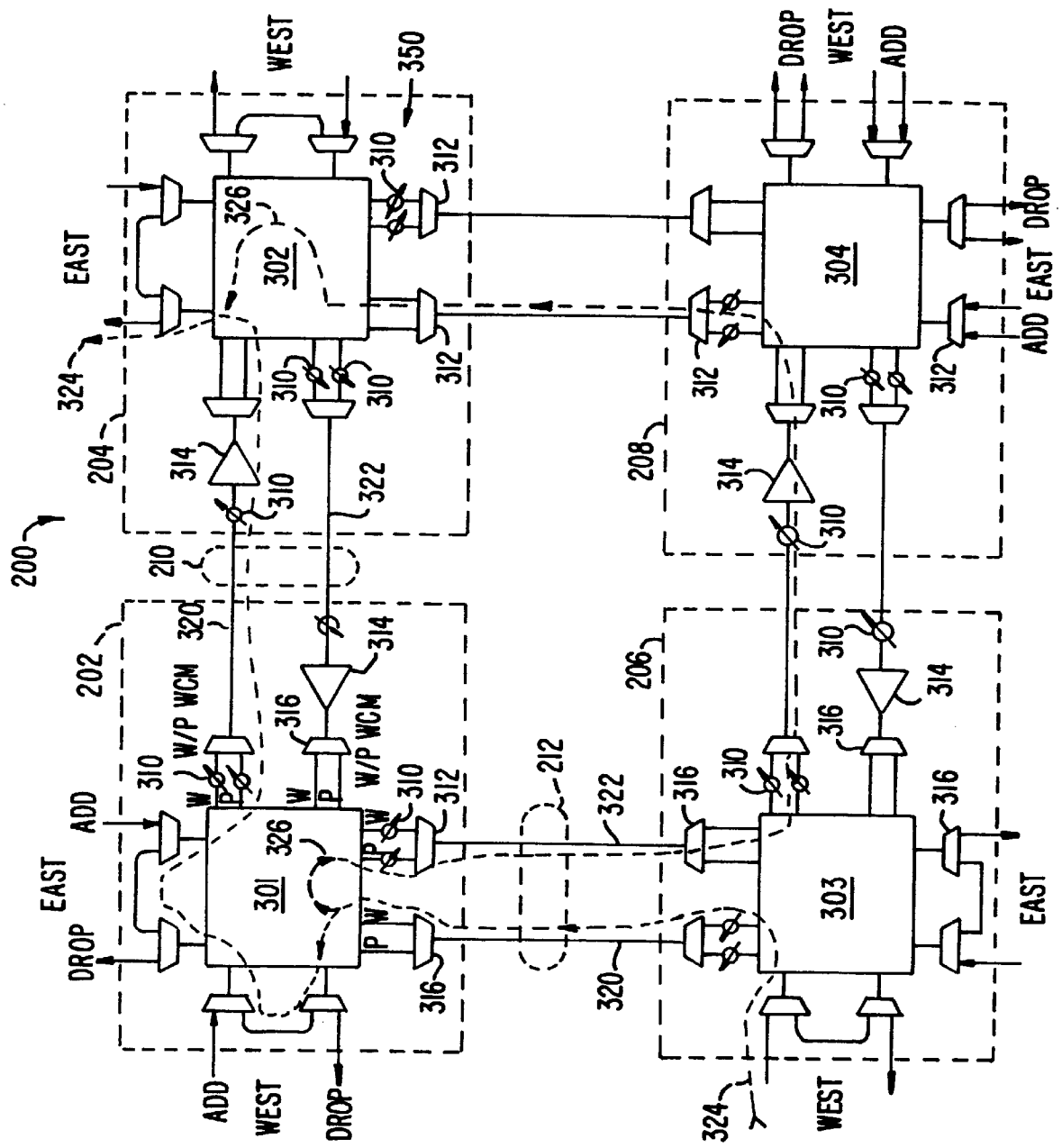
FIG. 3 shows a detailed view of network elements in the optical network 100.

FIG. 3 shows a detailed view of one embodiment of the network elements that make up the network 200. In FIG. 3, the parameter inputs and OSC links are not shown so that the resulting simplified diagram will aid in providing a clear description of the components used in the network elements.

The network elements 202, 204, 206 and 208 are shown broken into sub-components consisting of variable optical attenuators (VOA) 310, optical multiplexers (WDM) 312, optical demultiplexers 316, optical amplifiers 314 and ring switch modules 301, 302, 303 and 304. The network elements are shown having slightly different component arrangements which demonstrates that each network element can be flexibly configured to suit various network applications without deviating from the scope or operation of the present invention.

The VOAs 310 are used to attenuate optical signals by adjustable attenuation factors. For example, an optical signal having a level of −5 dBm may be attenuated by 5 dB to produce an output signal having a level of −10 dBm. The optical multiplexers are used to combine two or more optical signals (or channels) into a single optical signal that contains all the channels and maintains their respective power levels. For example, working and protect channels may be combined into one signal that includes both the working and protect channels while maintaining their relative power levels. The optical demultiplexers are used to split an optical signal into two or more optical signals that may represent component channels. The optical amplifiers are used to amplify an optical signal to form an amplified optical signal. The ring switch modules receive one or more input signals, and switches (or redirects) the input signals to one or more signal outputs. The signal links, for example signal links 210 and 212, are shown as having two signal paths. One path is a clockwise signal path 320 around the network and the other is a counterclockwise signal path 322 around the network.

The network elements 202 and 204 are shown with VOAs 310 and optical amplifiers 314 in the signal paths for signal link 210. This arrangement is used to provide additional signal amplification (or attenuation if necessary) when the network elements are separated by a great distance. In contrast, the network elements 202 and 206 are shown without the optical amplifiers 314 in the signal path 212. This arrangement is used when the network elements are close enough together that additional amplification of the signals is not required but signal attenuation may be required.

The ring switch modules are used to route optical signals through the network element. In some cases, the optical signals are routed to bypass a network element. For example, to demonstrate how a signal may be routed to bypass a network element, signal 324 enters the west input of node 206. The signal 324 is routed along signal link 212 to node 202, and further routed along signal link 210 to node 204 where it exits the network at the east terminal of the node. However, should signal link 210 be damaged or otherwise unavailable, ring switch 301 redirects the signal 324 to form the signal 326. The signal 326 is routed back through signal link 212 to node 206 and then routed to node 208 and finally to node 204. This alternate path allows the original signal to bypass signal link 210. From this example it is easy to see that the alternate path may be longer and have a different loss characteristic than the original path. Embodiments of the present invention are designed to account for such by-pass operation of the network so that it is possible to re-route signals while maintaining adequate power levels.

When a signal is routed through a network element, it may experience signal loss due to the components within the network element. This signal loss may vary based on the different types of components used in the network element and the routing path of the signal through the network element. As a result, to obtain consistent transmitted signal power levels, the losses of the internal components of the network element and the signal path variations through the network element must be accounted for.

Another feature of the present invention is shown at 350. On the transmission path from node 204 to node 208, VOAs 310 are coupled to signals prior to being input to the multiplexer 312. The VOAs provide adjustable attenuation to the signals so that their powers can be balanced before the signals are multiplexed together. Thus, the signals will have similar power levels when combined and experience similar losses when transmitted, and if amplified, will not be subject to the non-linear amplification effects that could result if the signals had not been balanced.

In one embodiment of the present invention, several modules are used within a network element to implement local power management. During local power management, loss values through a network element are based on nominal loss values for each internal component within the network element. However, it is also possible to obtain manufacturer calibration values for each of the internal components, so that exact loss values for each internal component can be derived from the calibration values and can be used to determined the loss values for signals routed through a network element.

The active management of power in the system occurs when a condition causes optical paths to change drastically. The VOAs control power fluctuations within each network element. Small power fluctuations are adjusted for automatically by VOA control loops. Power level changes larger than the relative power of a single wavelength cause the VOA to suspend attenuation control. The VOAs are alerted to changes in the system (e.g. ring switch event or a channel failure), which may result in local VOA settings being updated to compensate.

The power management controls are:
A VOA positioned before the receive amplifier to control the optical input power.
The working and protect paths through a node always experience different losses. To compensate, two VOAs equalize the working and protect output channels independently before being multiplexed by a working/protect WDM.

The modules used to implement local power management may be implemented via any combination of hardware and/or software within a network element. The following is a brief overview of the modules developed in accordance with the present invention, with detailed descriptions of the modules provided in other sections of this document.

Power Management Module

A Power Management module runs within each network element. In one embodiment, the Power Management module comprises a Central Power Management (CPM) module running within each node and communicating with Proxy Power Management (PPM) modules that run on each card (sometimes referred to as an internal component) within a node. As internal connections are provisioned between cards, the CPM determines power levels parameters at the card interfaces. In effect, the CPM acts to simulate how signal power levels will change as signals propagate from card to card through the node. The CPM stores these power parameters in its internal memory. The CPM then downloads the power parameters to the individual PPM modules that run on each card. The PPMs store the parameter information in parameter tables located on each card. The parameter information is also propagated to CPMs of adjacent nodes so that power level parameters computed at those nodes can account for the power levels of signals to be transmitted to them.

In another embodiment, a Power Management module runs on each card in a node. As cards are configured, the Power Management modules determine card edge to card edge power parameters and store this information in a parameter table. The Power Management modules then communicate with each other to negotiate power levels over each card interface. The Power Management modules that run in cards located at the east and west end of a node communicate the power parameters to upstream and downstream nodes.

Variable Optical Attenuator (YOA) Module

The VOAs are located on selected cards within each network element. Each VOA has a control loop that monitors input and output signal power levels. The VOAs provide adjustable attenuation and can respond quickly to small changes in the input power level to maintain a target output power level. The VOAs are used in association with several power management functions within the network element to guarantee that the network elements output consistent output power per wavelength.

Switching Module

A Switching Module operates in each network element to provide network switching information within the network element. For example, when a network element is required to switch its mode of operation from normal to ring switch, the switching module executing on the concerned network element indicates the switch event to associated VOAs and power management modules.

Wavelength Manager Module

A Wavelength Manager module operates in each network element to maintain a global view of wavelength s (channels) in the system and their status with respect to routing between source and destination nodes. Peer Managers on network elements indicate wavelength status between nodes. Thus, as the number of channels in a particular signal path changes, the Wavelength manager receives the channel status and indicates this information to concerned VOAS and other internal components within the network element.

Equipment Protection Module

An Equipment Protection module operates on each network element to signal an equipment protection event to concerned internal components. During an equipment protection event, the internal components switch to an operating mode whereby signals follow an alternate path within the network element.

Exemplary Internal Components

The following is a description of two internal components constructed in accordance with the present invention and suitable for use in embodiments of the present invention. Following the description of the internal components, exemplary embodiments of network elements constructed utilizing the internal components are described. The internal components described herein are exemplary internal components and not intended to limit the type of internal components which can be constructed in accordance with the present invention.

Figure 4:
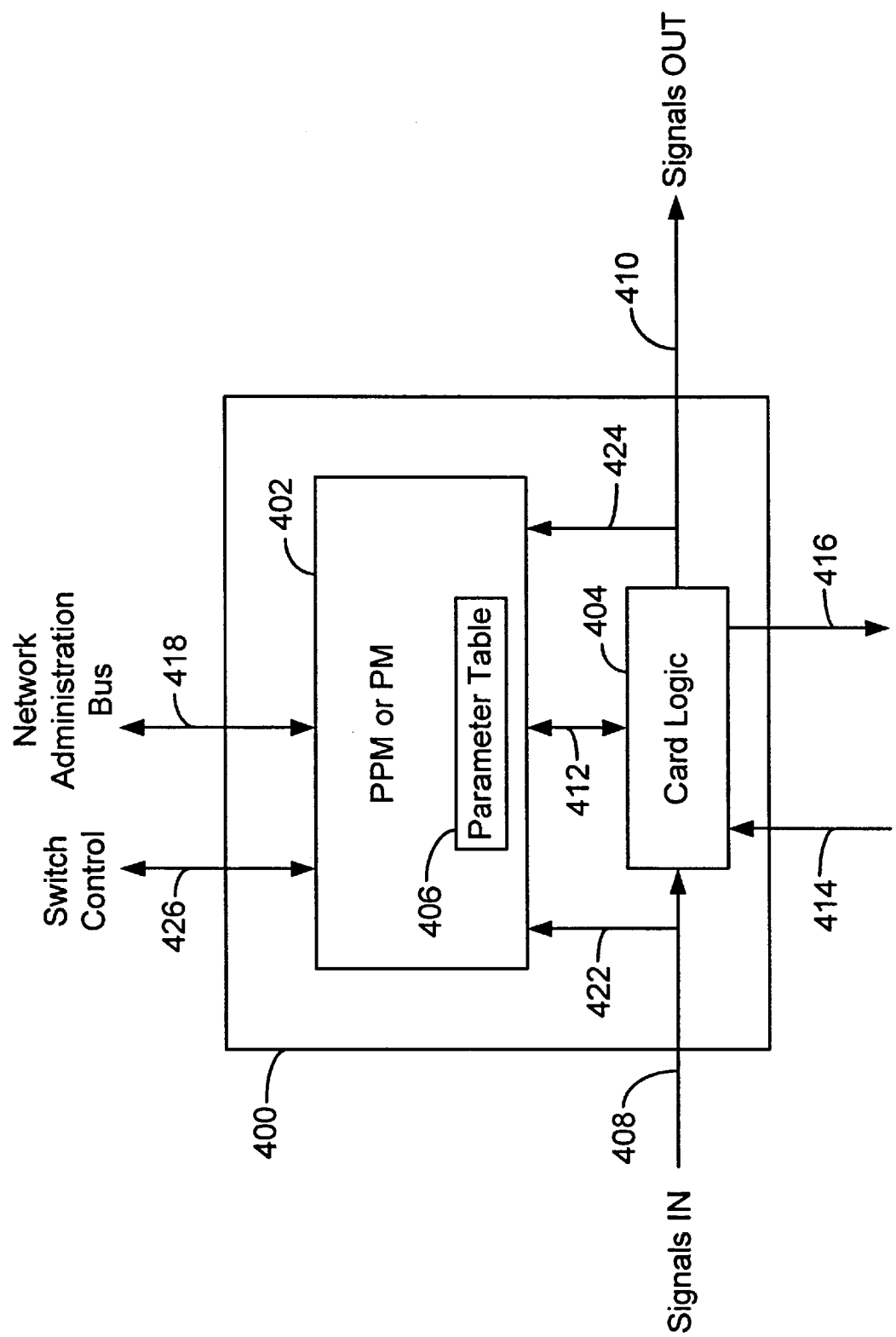
FIG. 4 shows a functional diagram of a first type of internal component constructed in accordance with the present invention for use in a network element.

FIG. 4 shows a block diagram representative of one type of internal component 400 constructed for use in a network element in accordance with the present invention. The internal component 400 can be designed as a detachable module or removable card that is installable in a network element. The internal component 400 comprises a power management module 402 coupled to card logic 404. In one embodiment the power management module is a PPM and operates to communicate with a CPM in a network element. In another embodiment the power management module is a stand alone PM that can handle power management functions for the internal component 400, and communication with other PMs located on other internal components within a network element. It will be assumed that the power management module is a PPM.

A parameter table 406 which contains parameters used during the provisioning of the internal component is coupled to the PPM. Provisioning is the process of configuring the card logic 404 to route selected inputs to produce selected outputs based on the operating mode of the internal component. The signal loss is computed for each route and stored in the parameter table 406.

The card logic 404 is representative of different processing functions and/or signal routing that the internal component 400 performs. For example, the card logic can represent a switch matrix where input signals are switched to output signals. Alternatively, the card logic can represent a signal multiplexer or signal demultiplexer where input signals are combined or split apart, respectively, to form output signals. The card logic has signal inputs 408, where one or more optical signals are input, and signal outputs 410, where one or more signals are output. Based on the process performed by the card logic, power level changes can occur between the input and output signals due to the signal routing, signal combining, signal splitting and/or internal losses.

The PPM 402 is coupled to the card logic via control channel 412. The PPM uses the control channel to select card logic signal paths, routing or processing functions that will operate on the input signals to form the output signals. For example, the PPM can direct the card logic via the control channel to combine two input signals to form one output signal. In another configuration, the PPM can direct the card logic via the control channel to split one input signal into two output signals. The card logic optionally includes an add input 414 and a drop output 416. The add input is used to add local signals to the card logic for processing. For example, local signals provided via the add input may be combined with the input signal to form the output signal. The drop output is used to provide a local output signal path, so that for example, signals split from the input signal by the card logic can be output locally.

The PPM 402 includes a network administrative port 418. The administrative port 418 can be coupled to a network administrative bus which may couple the PPM to a CPM and/or a network administrative entity. The administrative entity may then provide operating information about the network element in the data network, and consequently, about the operating mode of the internal component 400. The administrative port 418 may be coupled to a data network, such as an Ethernet network, which also couples to the administrative entity. The network administrative entity can exchange operating parameters with the PPM via the Ethernet connection. The administrative port 418 can also be coupled to equipment that is local to the network element to allow the network element and the internal component 400 to be locally configured and maintained.

In one embodiment, the PPM 402 communicates via the administrative bus to a CPM operating in the network element. The CPM controls the power management in the network element and downloads parameters to the PPM for storage in the parameter table. In a situation where exact loss values for the card logic are stored in the internal component 400, these exact loss values can be transmitted from the PPM to the CPM for use in performing power management functions, and then additional parameters can be sent from the CPM to the PPM for use by the internal component.

In another embodiment, where the power management module is a PM, the PM uses the administrative port to communicate with other PMs in the network element. In one embodiment, the PM 402 sends its parameter table to other PMs operating in other internal components within the network element. In return, the PM 402 can receive parameter tables being used by these other PMs. Thus, it is possible that the PM 402 of the internal component 400 can receive information about the operation of other internal components that are connected to it.

In another embodiment, the PM 402 has monitor inputs 422 and 424. The monitor inputs 422, 424 allow the PM to monitor input and output power levels of the card logic. For example, the monitor inputs allow the PM to measure (based on the configuration of the card logic) the power level of an output signal resulting from an input signal having a selected power level. Thus, the PM can use the control input to configure the card logic and then measure input and output power levels to determine signal level changes associated with particular card logic configurations. These signal levels are then stored in the parameter table and will eventually be transmitted to other internal components in the network element. By directly monitoring the input and output power levels, the PM can account for power variations due to component aging.

Both the PPM and the PM have a switch control input 426. The switch control input 426 receives switch control information from a switch control module (not shown) within the network element. The function of the switch control module is to receive network information regarding operating modes of the network element in the data network, and then pass this information via the switch control input 426 to the internal components of the network element. For example, the network element may be operating in a ring switch mode. The switch control module receives this operating information from the network and provides it to the internal components of the network element. The PPMs (PM) of the internal components use the switch control information to adjust signal paths defined by the card logic. As a result, input and output power parameters may change. For example, the PPM 402 uses the switch control information received at the switch control input 426 to change the operating mode of the card logic. In doing so, different parameters in the parameter table reflect the internal component's loss characteristics.

FIG. 5 shows an exemplary parameter table 500 for use with the internal component 400. The parameter table 500 has five switch modes shown as columns labeled, Normal 502, Ring Switch 504, Ring Switch Pass Thru 506, Equipment Switch 508 and other 510. Each of the switch modes has corresponding input and output power levels shown as rows labeled, Input level 512, Output level 514. An Internal loss 516 is represented in the third row and shows the loss through the internal component based on the switch mode. For example, in the Normal switch mode, the expected input signal level is −3 dBm and the resulting output signal level is −6 dBm. This represents an internal loss of 3 dB as shown. Thus, the parameter table describes signal power levels as they relate to various operating modes of the internal component.

Figure 6:
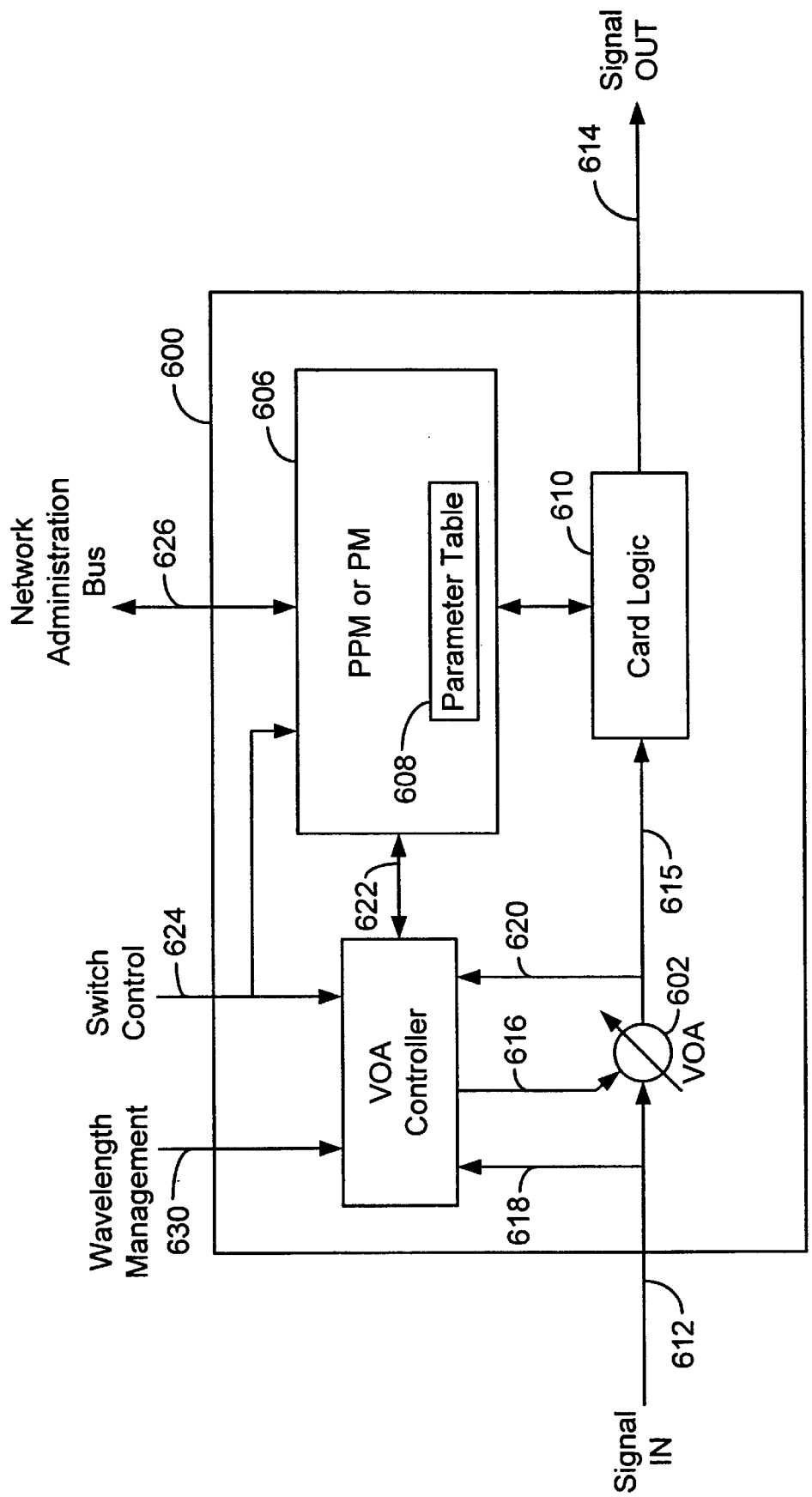
FIG. 6 shows a functional diagram of a second type of internal component constructed in accordance with the present invention for use in a network element.

FIG. 6 shows a block diagram for a second type of internal component 600 constructed in accordance with the present invention. The internal component 600 includes a VOA 602 and a VOA controller (VOAC) 604 coupled to an input signal 612. The VOA can attenuate the input signal by adjustable attenuation factors to produce an attenuated signal 615. The attenuated signal is processed by card logic 610 to produce an output signal 614. The VOAC couples to the VOA to provide a control loop that can adjust the VOA attenuation based on power level changes that occur to the input signal. For example, the VOAC adjusts the attenuation of the VOA so that small power fluctuations on the input signal 612 produce a constant target power on the attenuated signal 615. The internal component 600 utilizes the VOA 602 to provide the capability to operate over a wide dynamic range of input signal levels. Although the internal component 600 has the VOA coupled to the input signal 612, other embodiments of internal components may have a VOA coupled to the output signal 614 or may have a separate VOA coupled to each of the input 612 and output 614 signals. It will be apparent to one with skill in the art that different arrangements of the VOA and VOAC within the internal component are possible without deviating from the scope of the present invention.

The VOAC selects the attenuation factor via an attenuation control line 616 coupled between the VOA and the VOAC. Two signal level monitoring inputs 618, 620 couple the input signal 612 and the attenuated signal 615 to the VOAC, respectively. The VOAC uses the monitoring inputs 618, 620 to detect signal level changes and to adjust the attenuation factor of the VOA to achieve a specific target power level for the attenuated signal 615.

The internal component 600 also includes a power management module 606. In one embodiment the power management module is a PPM. In another embodiment the power management module is a PM. It will be assumed for the purpose of the following discussion that the power management module is the PPM. A parameter table 608 is coupled to the PPM. The PPM is coupled to the card logic 610 by a logic control line 632. The card logic is representative of logic to route, combine, split or provide other processing of the input signals as necessary to produce the output signal 614. The VOAC is coupled to the PPM by a VOAC channel 622, which allows the PPM to transmit information from the parameter table 608 to the VOAC. So, for example, based on the operating mode of the internal component 600, the parameter table contains parameters describing expected input signal levels and resulting signal output levels, these parameters can be transmitted to the VOAC from the PPM and used to determine the VOA attenuation setting which result in signal levels consistent with the expected input and output signal levels.

The PPM communicates via an administrative bus 626 to a CPM operating in the network element. The CPM controls the power management in the network element and downloads parameters to the PPM for storage in the parameter table. In a situation where exact loss values for the card logic are stored in the internal component 600, these exact loss values can be transmitted from the PPM to the CPM for use in performing power management functions, and then additional parameters can be sent from the CPM to the PPM for use by the internal component.

In another embodiment, there is no CPM in the network element. Each PM 606 is a stand alone module that controls the power management for their respective internal component. The PMs of the internal components can communicate with each other via the administrative bus and can communicate with PMs in other nodes via the OSC which can be accessed via the administrative bus.

A switch control input 624 is coupled to both the VOAC and the PPM. The switch control input is used to provide network switching information, so that, based on the switch mode of the network element, the VOAC can adjust the VOA and the PPM can adjust the card logic if necessary. For example, if the network node is to operate in a ring switch mode, the switch control input indicates this mode to the VOAC and the PPM. The VOAC can use the switch control information to access selected parameters from the parameter table to determine VOA attenuation settings which result in signal levels consistent with the expected input and output signal levels.

The network administration port 626 can couple to a network administration bus so that a network administrative entity can provide parameter information to the PPM for configuring the card logic 610 and to provide administrative information to the PPM about the operation of the network.

A wavelength management input 630 is coupled to the VOAC to provide information regarding wavelength status in the data network. For example, the input signal may initially comprise four wavelengths (channels), wherein the VOA is configured to receive corresponding signal power levels. If the number of wavelengths in the input signal changes, due to a network routing event for instance, the wavelength management input provides indications of these changes to the VOAC. The VOAC uses this information to determine if the attenuation factor of the VOA should be adjusted. If so, the VOAC uses the attenuation control line 616 to adjust the attenuation factor of the VOA to compensate for the change in the number of wavelengths in the input signal.

Thus, the internal component 600 incorporates the VOA 602 and the VOAC 604 to provide flexibility to allow a greater range of input power levels to produce acceptable output power levels. In addition, a wavelength management input provides information about network routing events that may affect the number of channels in the input signal, and therefore affect the power level. Even if the number of wavelengths does not change, adjustments to the VOA by the VOAC can be made to respond to changes in the input signal power caused by routing events or signal loss from other means.

FIG. 7 show an exemplary parameter table 700 for use with the second type of internal component 600. The parameter table 700 has five switch modes shown as columns and labeled, Normal 702, Ring Switch 704, Ring Switch Pass Thru 706, Equipment Switch 708 and other 710. Each of the switch modes has corresponding input and output power levels show as rows labeled, Input level 712, Output level 714 and Internal loss 716. For example, in the Normal switch mode, the expected input signal level is −3 dBm and the resulting output signal level is −6 dBm. This results in an internal loss of 3 dB as shown.

The parameter table 700 also includes a Number of wavelengths row 718 to indicate the number of wavelengths included in the input signal. Since there can be a wide range in the number of wavelengths in the input signal, the section of the table shown as 720 can be repeated as needed so that input, output and loss values can be derived for different numbers of wavelengths in the input signal. Thus, the parameter table describes signal power levels as they relate to the number of wavelengths in the input signal and the various operating modes of the internal component 600.

Exemplary Network Elements

The following is a description of two network elements constructed in accordance with the present invention and suitable for use in embodiments of the present invention. Following the description of the network elements, exemplary methods of operating the network elements in accordance with the present invention are described. The two network elements described herein are exemplary network elements and not intended to limit the type of network elements which can be constructed in accordance with the present invention.

Figure 8:
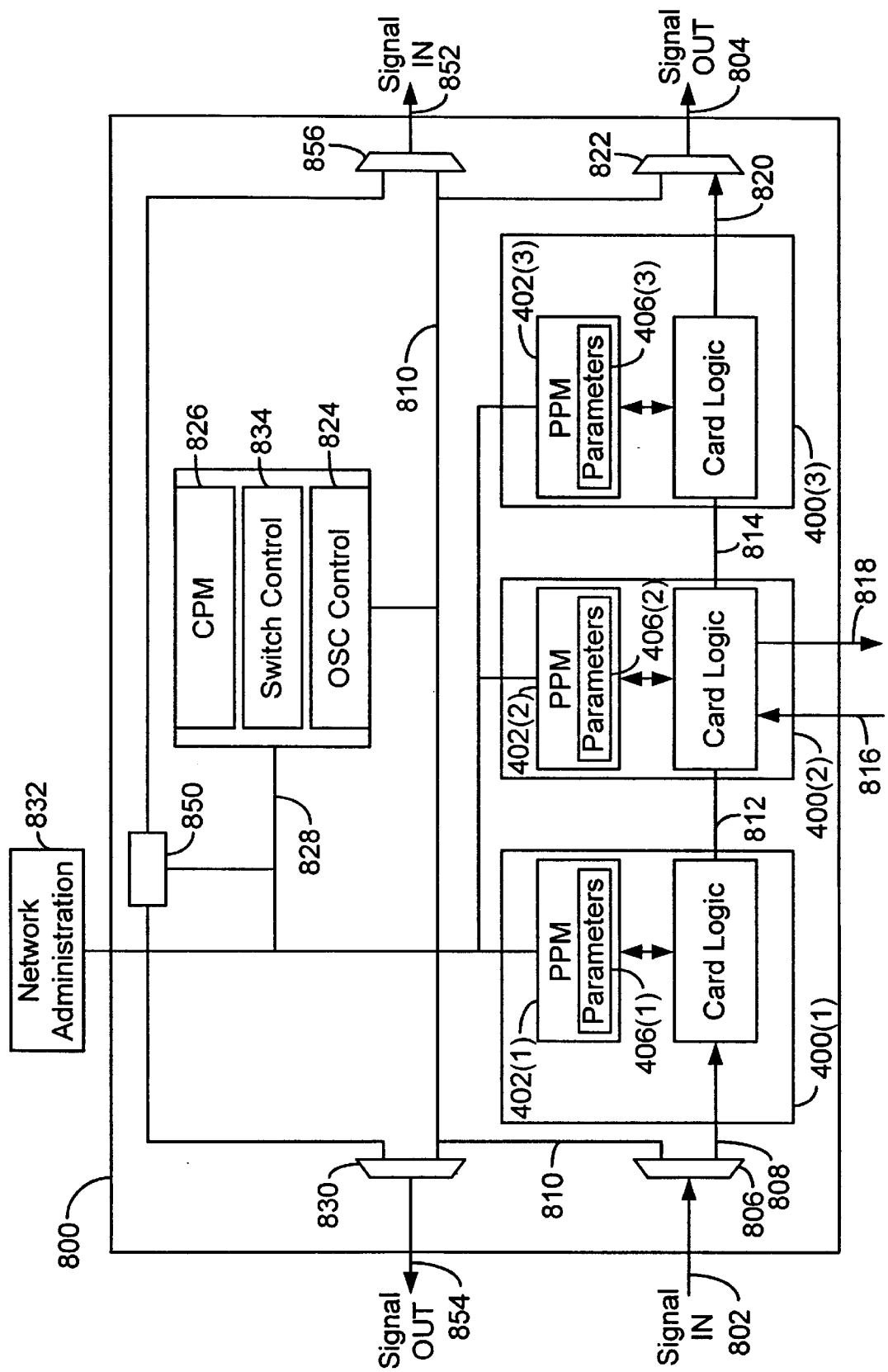
FIG. 8 shows a diagram of a first network element constructed in accordance with the present invention.

FIG. 8 shows an exemplary network element 800 constructed in accordance with the present invention. The network element 800 comprises three internal components representative of the internal component 400 which are referenced as 400(1), 400(2) and 400(3). For example, the internal components could be configured as a WDM for 400(1), a switch matrix for 400(2) and a WPS for 400(3). The network element 800 is suitable for use in an OBSLR network to receive an optical input signal 802 and produce an optical output signal 804.

For clarity, the network element 800 shows details of a signal path in one direction, however it will be apparent to those with skill in the art that the network element 800 may contain additional logic to form a second signal path in the reverse direction from the one shown. The logic which forms the second signal path is shown at 850 and processes a second input signal 852 to produce a second output signal 854. Thus, the network element 800 is configured to handle two signal paths in the OBSLR network, but only one path is shown in detail to facilitate a clear description.

The three internal components 400(1–3) are coupled together so that the input signal 802 can be processed by all three internal components to produce the output signal 804. The input signal 802 is input to a signal demultiplexer 806 where a network data portion 808 of the input signal is split off and input to internal component 400(1). The signal demultiplexer also splits off OSC signals which form an OSC bus 810. A second signal demultiplexer is shown at 856.

Within the network element 800, Proxy Power Management (PPM) modules 402(1–3) run on internal components within the network element. The PPMs communicate with a CPM 826 module via a network administrative bus 828. The CPM models the operation of the internal components and can compute input and output power levels of the internal components based on their respective operating modes. As inter-card connections are established, the CPM computes input and output power levels over each interface and downloads the parameters into the parameter tables 406 (1–3) associated with the PPMs.

Depending on the specific card, the CPM may have several interfaces for which it must model. Each interface specifies:

The average input power level per wavelength received at an interface.

The average output power level per wavelength transmitted from the interface. The output power level is calculated based on inputs from other card interfaces, the internal configuration of the card and its associated loss, and the internal path loss between each. interface.

Each card connection along an optical path has power information associated with it. The complete path can be traced to the boundary of the network element. Whenever a change occurs anywhere along the path (e.g. a card is removed or added, or the input power level changes at the network element boundary), for all connections that are impacted the CPM recalculates the interface power levels and downloads the new parameters to the associated parameter tables. This allows the CPM to adapt the network element to changes in configuration during installation and hardware upgrades.

In one embodiment, the power management strategy requires that each network element signal its output average power level per wavelength to downstream neighbors. Based on internal connections, the CPM analyzes the internal optical paths that result from protection switching. The worst-case output level is signaled to the downstream neighbor. These calculations ensure a consistent output level from the network element over all network protection events. Fluctuations, though, are expected during provisioning of the system toward a complete ring. Whether the CPM monitors a constant output power to the next node depends on the administrative state.

In another embodiment, the power management strategy requires that each network element compute signal power levels to achieve the best possible SNR for the overall network. Based on received parameter information, the CPM analyzes the internal optical paths to determine how to adjust received signals to obtain the best possible SNR.

In another embodiment, power parameters at each network element are computed in advance for some or all possible network switching events. These precomputed values are stored for future use. As a result, when network switching events occur, the network element access the stored parameters which allows them to quickly adjust to switching events. The time needed to calculate power parameters as switching events occur is saved.

The CPM supports a duplicate set of power parameters used for forecasting upgrade scenarios. These forecast power levels are maintained by all cards and signaled around the ring between network elements. This supports the addition of amplifiers or additional network elements to the ring (during a protection switch condition) with all power levels recomputed ahead of time. Then as new components are brought into the traffic path, the forecast values become the new values used to adjust the internal component settings of elements around the ring.

The following is further description of the network element 800. The data portion 808 of the input signal undergoes processing by card logic 404(1) to produce a first output 812. The first output 812 is input to the internal component 400(2) where it is processed by card logic 404(2) to produce a second output 814. An add signal input 816 couples to the card logic 404(2) so that optical signals may be added to the first output signal 812. A drop signal output 818 couples to card logic 404(2) so that signals may be dropped (and locally received) from either the first output signal 812, or if desirable, the add input signal 816. Note that internal components 400(1) and 400(3) may also have add and drop lines (see FIG. 4), however, in this example, they are not used and so are not shown in FIG. 8.

The second output 814 is input to internal component 400(3) where it is processed by card logic 404(3) to produce the third output signal 820. The third output signal 820 is input to signal combiner 822, where is it combined with the OSC bus 810 to form the output signal 804, which can be transmitted over the optical network to an adjacent network element. Another signal combiner is shown at 830.

Each of the internal components 400(1–3) have associated PPMs 402(1–3) and associated parameters tables 406(1–3), respectively. Since the interaction of the PPMs with their associated card logic has been described above with reference to FIG. 4, it will not be restated here. The PPMs are coupled to the administrative bus 828 so that parameters may be exchanged between the CPM and PPMs. The PPM can also exchange information with an OSC control module 824 via the administrative bus. The CPM can communicate with the CPMs of other network elements via the OSC bus 810.

The network administration bus 826 couples a network administrative entity 832 to the CPM and the PPMs of the internal components. The administration bus 828 may be any type of information bus or network, such as an Ethernet network. The Network administrative entity may be a remote network application or may be a device or application that is local to the network element 800 and coupled to the bus 828.

A network switch control 834 couples to the administration bus 828 to receive network switching information from the network administrative entity. The network switch control 834 communicates network switching information to the CPM 826. The CPM can further relay this information to the PPMs associated with each card.

The OSC control 824 coordinates the reception and transmission of information between network elements over the OSC bus 810. For example, the CPM can transmit parameters, indicating the power level of signals transmitted from the network element 800 to adjacent nodes, via the OSC bus 810.

Thus it is possible for the network element 800 to receive an input signal having both a data signal and OSC information, split the two apart, process the data signal to form an output data signal, process the OSC information, produce new OSC information, combine the new OSC information with the output data signal, and transmit the combined signals to another network element in the OBSLR network.

Figure 9A:
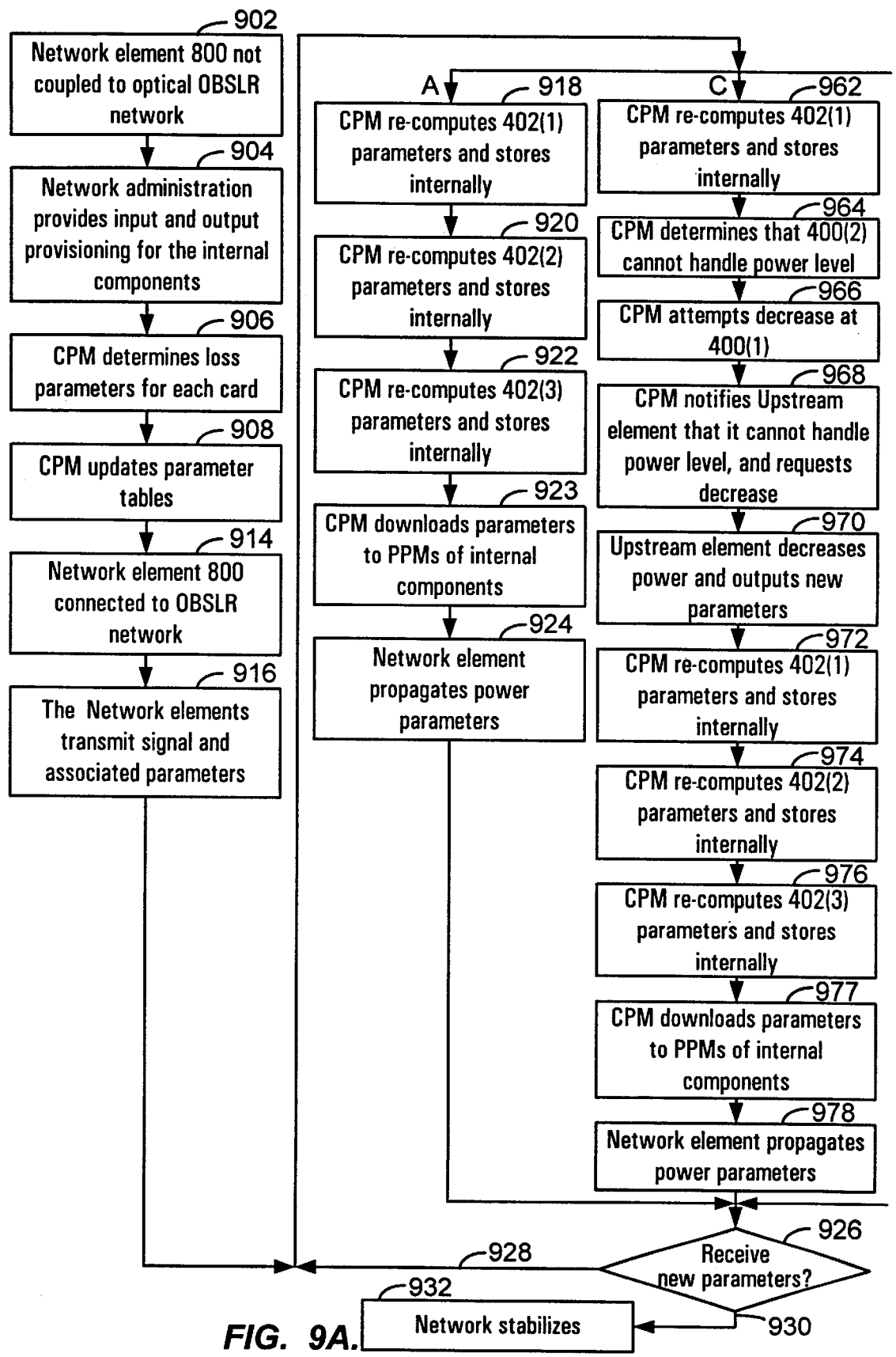
FIG. 9 shows a method of operating the first network element shown in FIG. 8 in accordance with the present invention.
Figures 9, 9B:
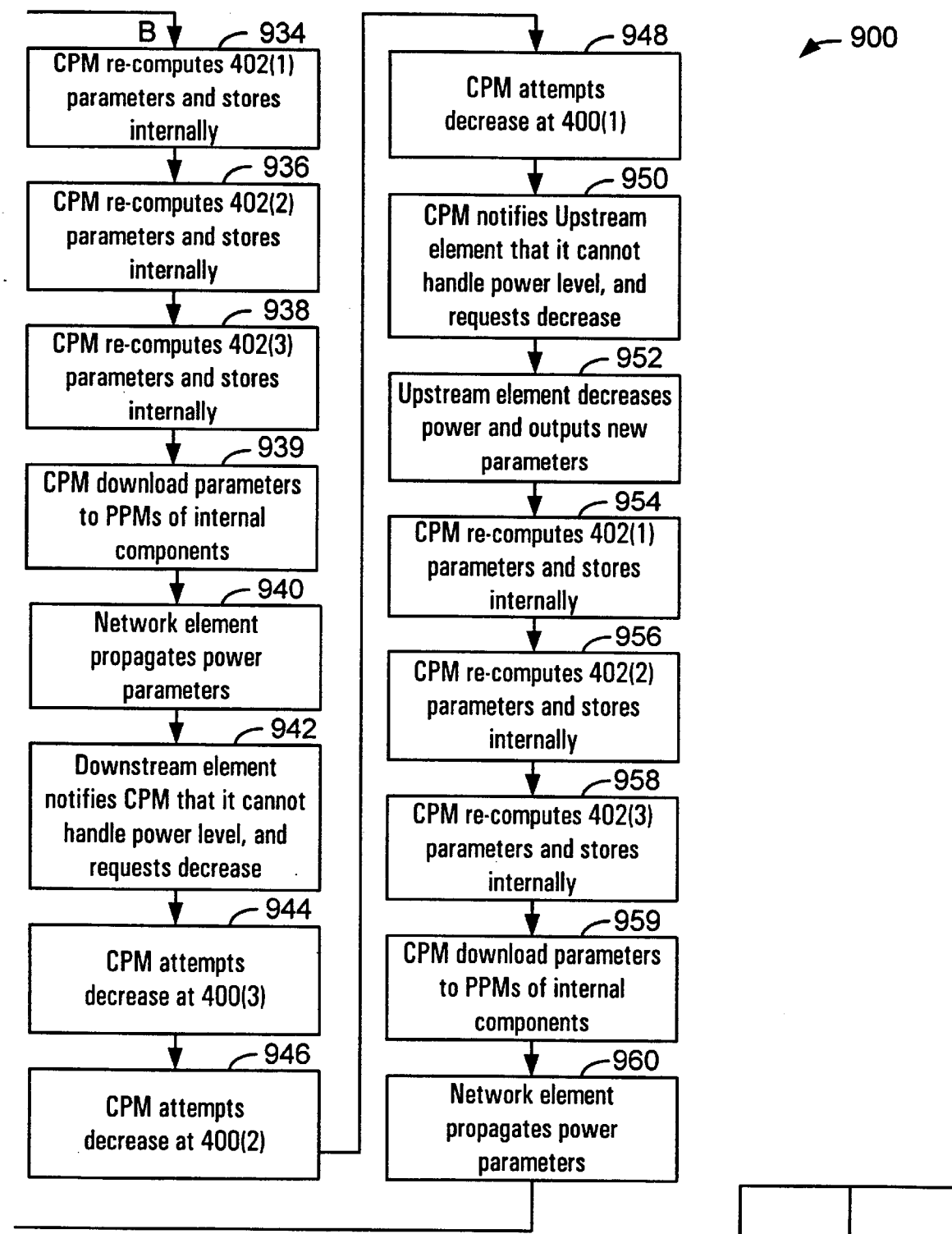

FIG. 9 shows a block diagram of a method 900 for operating the network element 800 in an optical network in accordance with the present invention. The method 900 provides a configuration process wherein the internal components 400(1–3) are configured to transport signals over various signal paths based on the operating (or switch) modes for the network element. The internal losses for each path are determined and stored in the parameters tables at each internal component Configuration information representing all possible output signal levels from the network element is transmitted to an downstream adjacent element. Upstream adjacent elements transmit their configuration information to the network element 800. The internal components are reconfigured based on the received information so that new path loss parameters are computed based on the received information. The configuration information is again exchanged with other network elements. This process continues until all the network elements settle on stable configuration values, whereby the loss for every path through a network element will be accounted for.

At block 902, the network element 800 is coupled to the network administrative entity via the administrative bus but is not yet coupled to the to data network. As a result, the network element 800 does not receive input signals from the network fiber nor does the output signal from the network element get transmitted on the network fiber to other elements in the network.

At block 904, the network administrative entity downloads configuration parameters to the CPM 826 and the PPMs of the internal components via the administrative bus 826. The configuration parameters describe how the internal components are provisioned to process signals under several operating modes. For example, in a normal mode of operation, the internal component 400(1) may be configured to demultiplex the input signal into one or more component signals for input to the internal component 400(2). The internal component 400(2) may be configured to add a new component signal via the add input and may drop one of the component signals via the drop output. The resulting component signals are input to the internal component 400(3) which may be configured to multiplex the component signals together to form an output signal for transmission on the data network.

At block 906, the CPM simulates the configuration of each internal component and computes associated loss parameters for signal paths associated with each operating mode. These loss parameters are stored internally at the CPM At block 908, the computed loss parameters are transmitted to each PPM for storage in their respective parameter tables. The path loss for each card is entered into the parameter table and represents the loss of the card logic when operating in specific modes. Thus, at the completion of block 908, the parameter tables of the PPMs will describe power loss characteristics of their respective internal component associated with various operating modes.

At block 914, the network element 800 is coupled to the OBSLR network to receive network inputs signals from upstream nodes and to transmit processed signals to downstream nodes. The coupling and decoupling of the network element 800 can be accomplished in several ways. The network element can be manually connected to the network, by an operator physically connecting network fiber to the network element. In an automated method, the network element is physically coupled to the data network, but the input and output signals of the network element can be independently switched on and off using switches internal to the network element. This allows a network administrator to remotely couple the network element with the data network, by sending instructions over the administrative network to control the internal switches.

At block 916, the element 800 receives parameters via the OSC channel that describe the level of the input signal which will be received from an adjacent upstream node (not shown). The upstream node being the network element that transmits signals to the network element 800. The parameters are received via the OSC bus by the OSC controller 824 and forwarded to the CPM. As this occurs, the CPM outputs parameters over the OSC to an adjacent downstream node (not shown). Initially the parameters indicate that no signal is presently being transmitted.

As actual data signals are input to the network, and signal power levels are detected, one or more configuration scenarios may occur. In a first scenario, shown at A in FIG. 9, the existing configuration of the network element 800 results in acceptable input and output signal levels for use in the data network. In a second scenario, shown at B in FIG. 9, the downstream node cannot handle the signal transmitted from the network element 800, and so, requests a power reduction. To compensate for the excessive signal, the signal levels are adjusted in accordance with the present invention. In a third scenario, shown at C in FIG. 9, the internal component 400(2) cannot handle the signal received from the internal component 400(1), and so, requests a power reduction. To compensate for the excessive signal, the signal levels are adjusted in accordance with the present invention. The method 900 demonstrates the three scenarios in the following description.

At block 918, the scenario A begins when parameter information from an upstream adjacent node indicates signal levels that will be transmitted to the network element 800. The parameters are transmitted over the OSC and received by the OSC controller 824, which in turns forwards them to the CPM 826. The CPM re-computes the loss parameters for the internal component 400(1) and the determines that the expected signal levels can be adequately processed by the card 400(1). The CPM stores these re-computed parameters in its internal storage.

At block 920, the CPM re-computes the input and output loss parameters for the card 400(2) based on the updates to parameters for the card 400(1). The CPM determines that the expected signal levels can be adequately processed by the card 400(2), and so, the CPM stores these re-computed parameters for 400(2) in its internal storage.

At block 922, the CPM re-computes the input and output loss parameters for the card 400(3) based on the updates to parameters for the card 400(2). The CPM determines that the expected signal levels can be adequately processed by the card 400(3), and so, the CPM stores these re-computed parameters for 400(2) in its internal storage.

At block 923, the CPM has completed parameter calculations for all the internal components and downloads these parameters to the PPMs of the internal components. The PPMs may adjust their respective internal components based on the received parameters.

At block 924, the CPM now knows the expected inputs signal level from the upstream node and the loss expected from the internal component 800. The CPM transmits these signal level parameters to a downstream adjacent network element. In accordance with the invention, as the power parameters propagate down the network, each network element updates its internal component parameter tables and the resulting revised parameters are transmitted to the next element in the network. For example, if power level updates to the node upstream from the network element 800 affect power levels transmitted from the upstream node, then the network element 800 would update its internal components to reflect these changes and transmit the adjusted parameters to the downstream network element.

At block 926, if different parameters are received from the upstream node, then the method 900 proceed on path 928 to update the parameter tables of the internal components with the newly received parameters. If no different parameters are received, then the method 900 continues on path 930.

At block 932, the data network continues to move toward stabilization. Even though no new parameters were received by the network element 800, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

The scenario B demonstrates how signal level changes are made to accommodate inadequate signal levels. The scenario B begins when new parameters arrive at the network element 800 from the upstream node. The new parameters indicate that the power level of the signal transmitted from the upstream node is not as expected by the network element 800.

At block 934, the new parameters are transmitted over the OSC and received by the OSC controller 824, which in turns forwards them to the CPM 826. The CPM re-computes the loss parameters for the internal component 400(1) and determines that the expected signal levels can be adequately processed by the card 400(1). The CPM stores these re-computed parameters in its internal storage.

At block 936, the CPM re-computes the input and output loss parameters for the card 400(2) based on the updates to parameters for the card 400(1). The CPM determines that the expected signal levels can be adequately processed by the card 400(2), and so, the CPM stores these re-computed parameters in its internal storage.

At block 938, the CPM re-computes the input and output loss parameters for, the card 400(3) based on the updates to parameters for the card 400(2). The CPM determines that the expected signal levels can be adequately processed by the card 400(3), and so, the CPM stores these re-computed parameters in its internal storage.

At block 939, the CPM has completed parameter calculations for all the internal components and downloads these parameters to the PPMs of the internal components. The PPMs may adjust their respective internal components based on the received parameters.

At block 940, the CPM now knows the expected inputs signal level from the upstream node and the loss expected from the internal component 800. The CPM transmits these signal level parameters to a downstream adjacent network element over the OSC. In accordance with the invention, as the power parameters propagate down the network, each network element updates its internal component parameter tables and the resulting revised parameters are transmitted to the next element in the network.

At block 942 the downstream node determines from the newly received parameters that the signal level it is to receive from the network element 800 is too high and cannot be adequately processed. The downstream node transmits a request over the OSC to the network element 800 to reduce its output power level. This request is received by the CPM.

At block 944, the CPM determines if the signal level can be reduced at the card 400(3). However, the card 400(3) does not include a VOA and so cannot reduce the signal level.

At block 946, the CPM determines if the signal level can be reduced at the card 400(2). However, the card 400(2) does not include a VOA and so cannot reduce the signal level.

At block 948, the CPM determines if the signal level can be reduced at the card 400(1). However, the card 400(1) does not include a VOA and so cannot reduce the signal level.

At block 950, the CPM notifies the upstream node that it cannot handle the expected signal power level and requests a decrease in the level. The request is made over the OSC channel.

At block 952, the upstream network element decreases the signal level of the input signal. Either the upstream element has logic to decrease the signal level or the upstream element requests a signal level reduction from other network entities further upstream on the transmission path for the signal. Once the signal level is decreased, the upstream element updates its parameter tables and transmits updated parameters to the network element 800.

At block 954, the updated parameters that are transmitted from the upstream node over the OSC are received by the OSC controller 824, which in turns forwards them to the CPM 826. The CPM re-computes the loss parameters for the internal component 400(1) and determines that the expected signal levels can be adequately processed by the card 400(1). The CPM stores these re-computed parameters in its internal storage.

At block 956, the CPM re-computes the input and output loss parameters for the card 400(2) based on the updates to parameters for the card 400(1). The CPM determines that the expected signal levels can be adequately processed by the card 400(2), and so, the CPM stores these re-computed parameters in its internal storage.

At block 958, the CPM re-computes the input and output loss parameters for the card 400(3) based on the updates to parameters for the card 400(2). The CPM determines that the expected signal levels can be adequately processed by the card 400(3), and so, the CPM stores these re-computed parameters in its internal storage.

At block 959, the CPM has completed parameter calculations for all the internal components and downloads these parameters to the PPMs of the internal components. The PPMs may adjust their respective internal components based on the received parameters.

At block 960, the CPM now knows the expected inputs signal level from the upstream node and the loss expected from the internal component 800. The CPM transmits these signal level parameters to a downstream adjacent network element over the OSC. The request to decrease the power level has been satisfied so the downstream node can now handle the signal levels transmitted from the network element 800.

The downstream network element propagates its new parameters to other elements in the network. Each element in the data network exchanges configuration parameters as describe above. This negotiation process happens over a selected time period which may vary depending on the significance of the signal level adjustments and the number of network elements affected.

At block 926, if different parameters are received from the upstream node, then the method 900 proceed on path 928 to update the parameter tables of the internal components with the newly received parameters. If no different parameters are received, then the method 900 continues on path 930.

At block 932, the data network continues to move toward stabilization. Even though no new parameters were received by the network element 800, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

The scenario C demonstrates how signal level changes are made to accommodate inadequate signal levels. The scenario C begins when different parameters arrive at the network element 800 from the upstream node. The different parameters indicate that the power level of the signal transmitted from the upstream node is not as expected by the network element 800.

At block 962, the different parameters are transmitted over the OSC and received by the OSC controller 824, which in turns forwards them to the CPM 826. The CPM re-computes the loss parameters for the internal component 400(1) and determines that the expected signal levels can be adequately processed by the card 400(1). The CPM stores these re-computed parameters in its internal storage.

At block 964, the CPM re-computes the input and output loss parameters for the card 400(2) based on the updates to parameters for the card 400(1). The CPM determines that the expected signal levels cannot be adequately processed by the card 400(2). The CPM determines that the anticipated signal level is too high. The CPM stores these re-computed parameters in its internal storage.

At block 966, the CPM determines if the signal level can be reduced at the card 400(1). However, the card 400(1) does not include a VOA and so cannot reduce the signal level.

At block 968, the CPM notifies the upstream node that it cannot handle the expected transmitted signal level and requests a decrease in the signal power. The request is made over the OSC channel.

At block 970, the upstream network element decreases the signal level of the input signal. Either the upstream element has logic to decrease the signal level or the upstream element requests a signal level reduction from other network entities further upstream on the transmission path for the signal. Once the signal level is decreased, the upstream element updates its parameter tables and transmits updated parameters to the network element 800.

At block 972, the updated parameters are transmitted from the upstream node over the OSC and received by the OSC controller 824, which in turns forwards them to the CPM 826. The CPM re-computes the loss parameters for the internal component 400(1) and determines that the expected signal levels can be adequately processed by the card 400(1). The CPM stores these re-computed parameters in its internal storage.

At block 974, the CPM re-computes the input and output loss parameters for the card 400(2) based on the updates to parameters for the card 400(1). The CPM determines that the expected signal levels can now be adequately processed by the card 400(2), and so, The CPM stores these re-computed parameters in its internal storage.

At block 976, the CPM re-computes the input and output loss parameters for the card 400(3) based on the updates to parameters for the card 400(2). The CPM determines that the expected signal levels can be adequately processed by the card 400(3), and so, the CPM stores these re-computed parameters in its internal storage.

At block 977, the CPM has completed parameter calculations for all the internal components and downloads these parameters to the PPMs of the internal components. The PPMs may adjust their respective internal components based on the received parameters.

At block 978, the CPM now knows the expected inputs signal level from the upstream node and the loss expected from the internal component 800. The CPM determines expected output signal power levels and transmits these signal level parameters to a downstream adjacent network element over the OSC.

The downstream network element propagates its new parameters to other elements in the network. Each element in the data network exchanges configuration parameters as describe above. This negotiation process happens over a selected time period which may vary depending on the significance of the signal level adjustments and the number of network elements affected.

At block 926, if different parameters are received from the upstream node, then the method 900 proceed on path 928 to update the parameter tables of the internal components with the newly received parameters. If no different parameters are received, then the method 900 continues on path 930.

At block 932, the data network continues to move toward stabilization. Even though no new parameters were received by the network element 800, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

Figure 10:
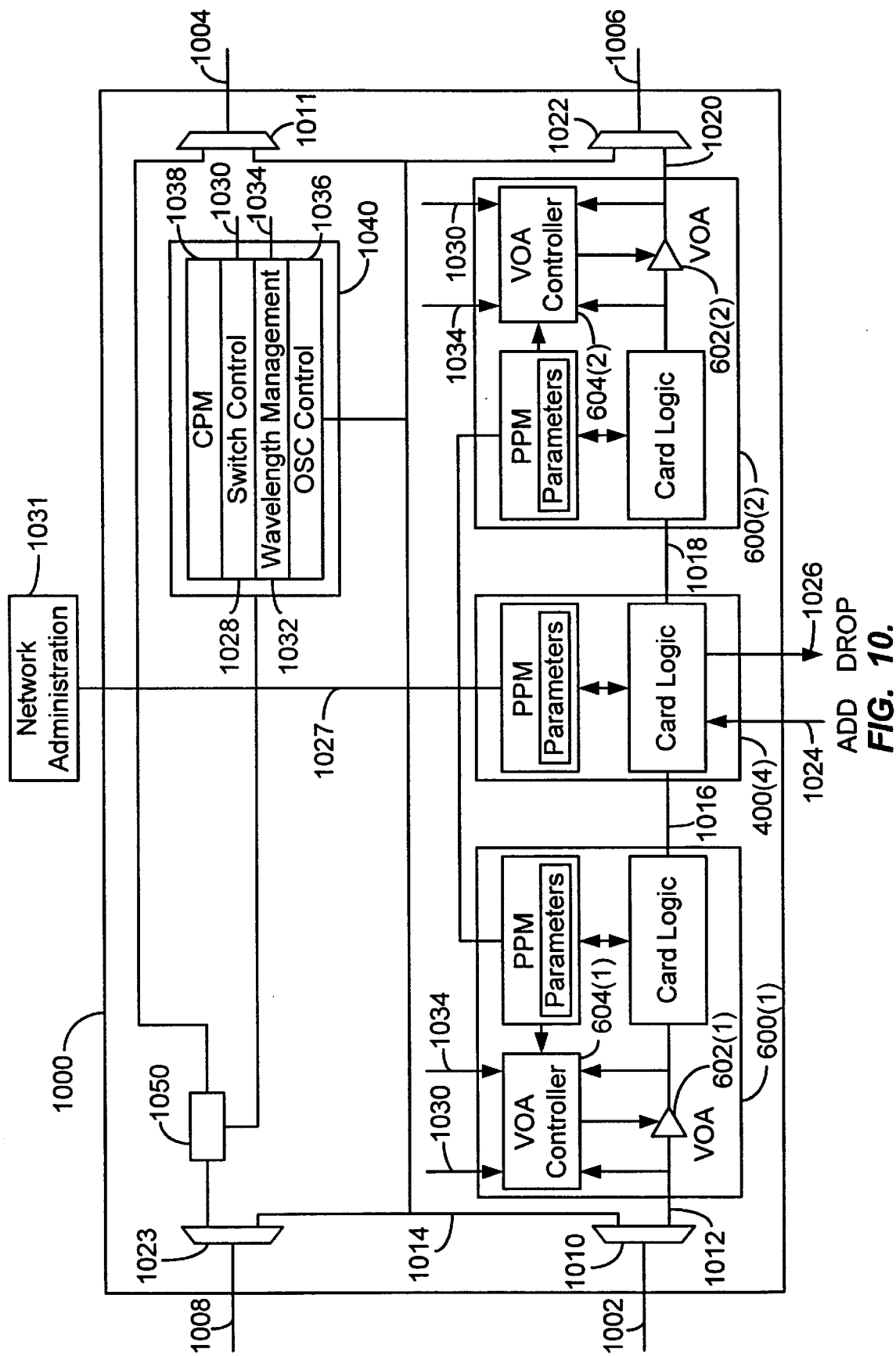
FIG. 10 shows a diagram of a second network element constructed in accordance with the present invention.

FIG. 10 shows an exemplary embodiment of a second network element 1000 constructed in accordance with the present invention. The network element 1000 is suitable for use in an OBSLR network to receive optical input signals 1002 and 1004 and to produces optical output signals 1006 and 1008, respectively.

For clarity, the network element 1000 shows logic that forms a signal path in one direction, for example, the input signal 1002 flows through the network element 1000 to form the output signal 1006. It will be apparent to those with skill in the art that the network element 1000 comprises logic to form a second signal path in the reverse direction from the one shown. The logic which forms the second signal path is shown at 1050 and is designed to receive information from the input signal 1004 and to produce information on the output signal 1008. Thus, the network element 1000 is configured to handle two signal paths in the OBSLR network, but only one path is shown in detail to facilitate a clear description.

Three internal components 600(1), 600(2) and 400(4) are coupled together to process information from the input signal 1002 to produce information for transport on the output signal 1006. The internal components 600(1,2) have VOAs 602(1,2) coupled to operate on the input 1002 and output 1006 signals, respectively. The input signal 1002 is input to a signal demux 1010 wherein a data signal 1012 is split off the input signal 1002 and input to the internal component 600(1). The signal demux 1010 also splits off signals associated with an OSC bus 1014. A similar demux 1011 is used in the reverse signal path.

The data signal 1012 is coupled to the internal component 600(1) which operates to produce a first output 1016 that is coupled to the internal component 400(4). The internal component 400(4) operates to produce a second output 1018 which is coupled to the internal component 600(2). The internal component 600(2) operates to produce a third output 1020 which is combined with the OSC bus 1014 at signal mux 1022 to produce the output 1006. Thus, signals from the OSC bus are combined with network data signals to extend the OSC bus between upstream and downstream network elements. A similar signal mux 1023 is provided for signals in the reverse signal path.

An add input 1024 is provided by the internal component 400(4), so that local signals may be added to the network signal path. A drop output 1026 is provided by the internal component 400(4), so that network signals can be dropped from the network signal path to form local signals.

The network element 1000 also includes a network administrative bus 1027 that couples to the internal components. The administrative bus 1027 also couples to several modules which provide additional functionality to assist in locally managing signal power levels. A switch control unit 1028 is coupled to the network administration bus to receive network switching information and to provide this information to the internal components via an internal switch bus 1030. The switching information describes various operating modes possible by the network element while operating in the optical network. For example, the network element may operate in a ring switch mode or may operate in a normal mode. A network entity 1031 coupled to the administrative bus can select the mode of operation for the network element 1000 by providing the appropriate switching information to the switch control unit 1028, which in turn provides the switching information to various modules of selected internal components, such as the VOACs 604(1,2).

Each VOA 602(1,2) has a control loop implemented by its associated VOAC that monitors the input power to the VOA and adjusts the output power to a constant level based on the number of wavelengths in the input and the target output power per wavelength. Normally, the control loop runs in closed mode to adjust for incremental power changes resulting from component aging or temperature. A small change in power level results in the attenuation changing immediately.

For a large power changes, the VOAC assumes something has changed the wavelength distribution or network topology (e.g. a transponder failure, or ring switch). The VOAC automatically opens the control loop and waits for an update on what has changed. Inputs from other modules, such as the switch control module 1030, are used by the VOAC to adjust the attenuation factor of the VOA to account for the changed conditions. After a hold-off period, the VOAC closes the control loop to "fine tune" the output power level of the VOA based on the new settings.

The VOAC maintains the local data required to compute VOA attenuation settings. This data consists of:

The number of wavelengths through a VOA under normal, equipment switching, and ring switching conditions—the number of wavelengths vary due to these events. The administrative entity provides this data as part of configuring the system. Adjustments to the wavelength numbers are made as wavelength status events are received due to failures in the system.

The input power/wavelength for normal and protection scenarios. The PPM on the card provides this information.

The target output power/wavelength at the VOA output. The PPM on the card provides this information.

The VOAC operates the control loop to provide the ability to set the maximum attenuation to support squelching requirements in during network switching.

In one embodiment of the present invention, the control loop for a VOA measures the combined optical power at the VOA. It infers the average power by dividing the total power by the number of channels it knows should be traversing the VOA. The VOA is then adjusted to provide the desired power at its output. This feedback loop adjusts for variations in the behavior of the VOA, the transmitter powers of the channels, and losses in the path leading to the VOA. This calculation depends on knowledge of the number of channels traversing the VOA, which is typically a stable integer. However, in the event of an upstream failure (e.g. source transmitter or fiber break), some channels would disappear from the bundle. The calculation, and therefore the VOA adjustment, would be incorrect. Another reason for a change in the number of channels through a VOA would be dynamic provisioning of channels in the network. This provisioning might be effected by enabling and disabling transmitters, optical switching, tuning transmitters to different wavelengths or tuning optical add/drop components.

One method to handle the change in the number of channels begins by detecting an abrupt change in the total input power level to the VOA. On detecting such a change, which may be outside the range of the normally expected variations mentioned above, the feedback loop "opens" and maintains the current VOA setting (i.e. voltage, current or position input into the VOA component). The loop remains open until new information is received at the VOAC about the abrupt power change, for example, information about a change in the number of channels. After this information is received, the loop is "closed" and the VOA output power level is adjusted, using the feedback loop, to a new average power calculated using the new number of channels. If the information update to the VOAC is delayed, but the power level after the abrupt change is stable, it is possible for the VOA control loop to stabilize the VOA output at that power level pending further information.

The switch control 1028 on each network element publishes ring switch events during protection switching. These events are used to notify the VOACs to adjust the VOA attenuation value based on the appropriate power level and wavelength information for the ring switch event.

A wavelength management unit 1032 is also included in the network element 1000. The wavelength management unit 1032 couples to the administration bus 1027 to receive wavelength information from the network administration. The wavelength management unit distributes the wavelength information to the internal components of the network element 1000 via an internal wavelength information bus 1034. The wavelength information describes the number and type of wavelengths (channels) that are included in the input signal 1002 received by the network element 1000. As channels are added or subtracted from the input signal, these changes are indicated to the internal components of the network element 1000 to allow them to adjust for changes in optical power levels. For example, a change in the number of channels received at the input of the internal component 600(1) is indicated to the VOAC via the wavelength information bus 1034. As a result, the VOAC may adjust the attenuation of the VOA to compensate for the wavelength change.

The wavelength management unit on each network element signals to peers around the ring as changes occur in wavelength status. The status signaling follows the path of the wavelength, so that channel failures are properly reported during ring protection events. Each wavelength is identified by the operational status of both its source and destination node. This wavelength signaling is used to notify network elements around the ring whenever a Loss of Signal (LOS) occurs at the destination, or the source has failed or been turned off. As wavelength status changes, the wavelength manager generates internal wavelength status events to the PPMs. It is also responsible for sourcing the ring status signaling for wavelengths that are added or dropped, for example at the add input 1024 and drop output 1026.

An OSC controller unit 1036 is also included in the network element 1000.

The OSC controller 1036 couples to the administration bus 1027 to receive configuration information from the network administration and operates an OSC bus 1014 to couple to the internal components. The internal components can exchange parameters with each other via the OSC bus 1014. The OSC bus 1014 couples to the input signals 1002, 1004 and the output signals 1006, 1008 via demultiplexers 1010, xxx and multiplexers 1022, xxx respectively, to allow the internal components to exchange parameters with other network elements coupled to the optical network.

A CPM 1038 is also included in the network element 1000. The CPM controls local power management and transmits power parameters to adjacent network elements via the OSC controller 1036.

The internal components 400(4) and 600(1,2) operate as described above with reference to FIG. 4 and FIG. 6, to provide signal processing and power management flexibility to the network element 1000. Since the internal components 600(1,2) incorporate VOAs, the network element 1000 will be able to adjust for changing input and output signal level requirements and therefore are suitable to handle network switching events wherein the input and output signals may have varying power levels. These signals are scaled as necessary, for example, by the VOA 602(1) and VOA 602(2), so that processing within the network element will result in the output signal 1006 having a selected power level to meet the power input requirements of the downstream network element.

Although the CPM 1038, switch control 1028, wavelength manager 1032 and the OSC controller 1036 are shown as being provided in a supervisory module 1040 in the network element 1000, all the above may be comprised of one or more software modules that may run together or individually on one or more processors within the network element. For example, many components within the network element contain processors that can run the software associated with each of the above modules. Thus, the modules may be distributed to execute on different processors within the network element.

Figure 11A:
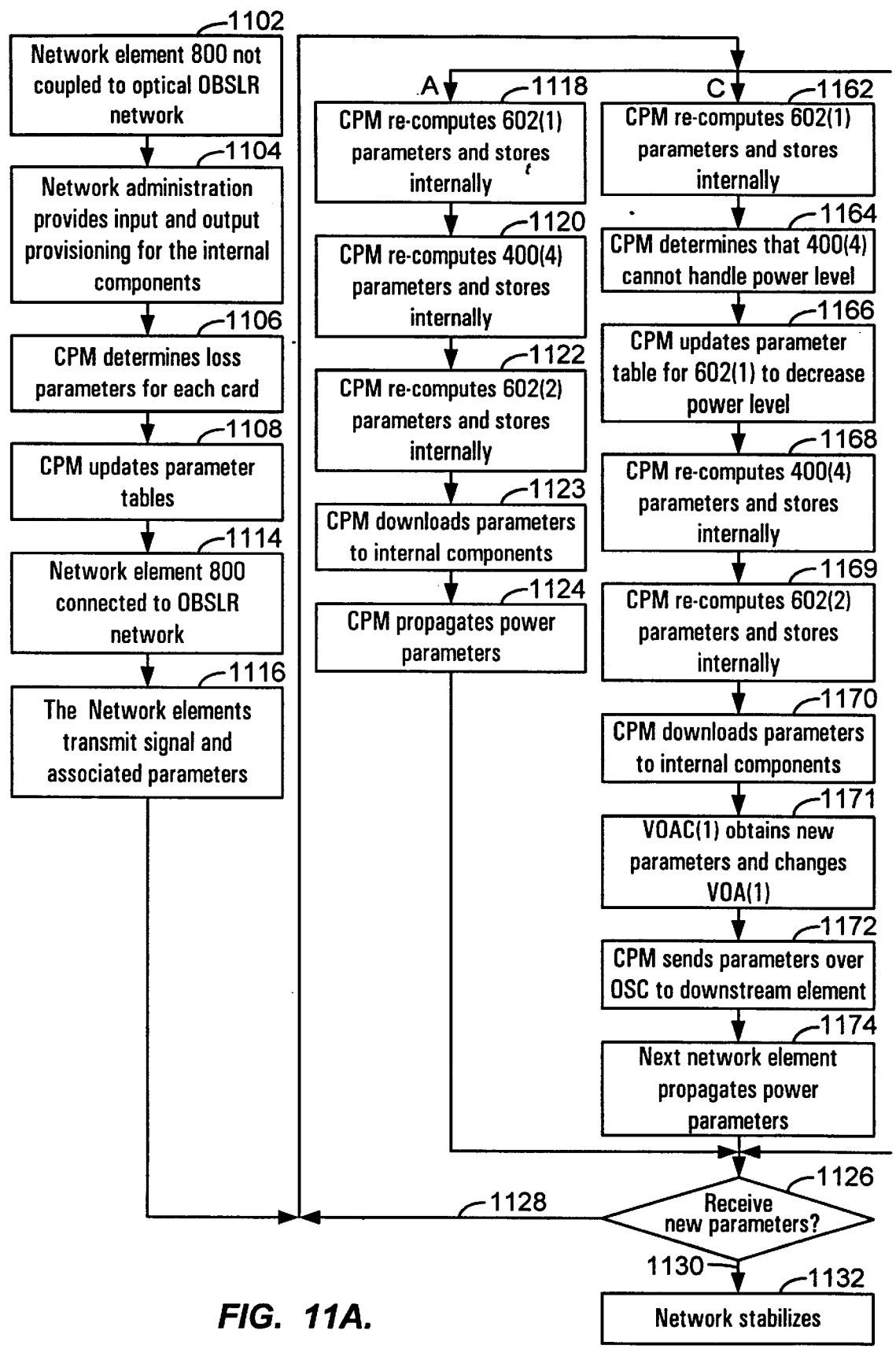
FIG. 11 shows a method of operating the second network element shown in FIG. 10 in accordance with the present invention.
Figures 11, 11B:
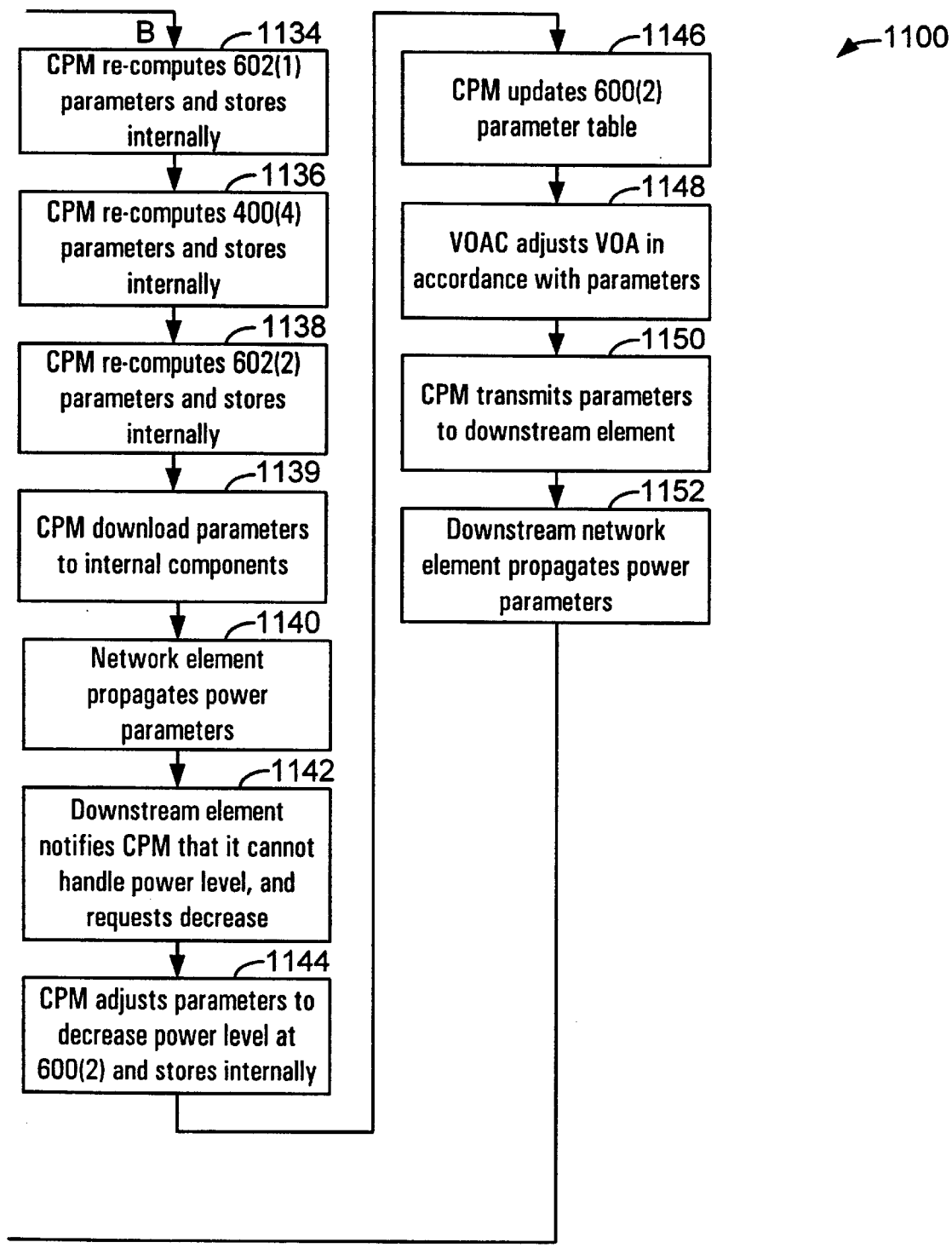

FIG. 11 shows a block diagram for a method 1100 of operating the network element of FIG. 10 in accordance with the present invention. The method 1100 provides for a configuration process wherein each network element in the network produces output signals having selected output power for every network switching event. The internal losses for each path through the network element are determined and stored in the parameters tables at each internal component. Configuration information representing all possible output signal levels from one network element is transmitted to a downstream element. An upstream adjacent element transmits its configuration information to the network element 1000. Based on the received information, new path loss parameters are computed. Updated configuration information is transmitted to the downstream network element. This process continues until all the network elements settle on stable configuration values, whereby the loss for every path through every network element will be accounted for.

At block 1102, the network element 1000 is coupled to the network administrative entity via the administrative bus but is not yet coupled to the to data network. As a result, the network element 1000 does not receive input signals from the network fiber nor does the output signal from the network element get transmitted on the network fiber to other elements in the network.

At block 1104, the network administrative entity 1031 downloads configuration parameters to the CPM 1038 and the PPMs of the internal components via the administrative bus 1027. The configuration parameters describe how the internal components are provisioned to process signals under several operating modes. For example, in a normal mode of operation, the internal component 600(1) may be configured to demultiplex the input signal into one or more component signals for input to the internal component 400(4). The internal component 400(4) may be configured to add a new component signal via the add input and may drop one of the component signals via the drop output. The resulting component signals are input to the internal component 600(2) which may be configured to multiplex the component signals together to form an output signal for transmission on the data network.

At block 1106, the CPM simulates the configuration of each internal component and computes associated loss parameters for signal paths associated with each operating mode in each of the internal components.

At block 1108, the computed loss parameters are transmitted to each PPM for storage in their respective parameter tables. The path loss for each card is entered into the parameter table and represents the loss of the card when operating in a specific mode. This sequence occurs for all the internal components and is repeated for all the operating modes Thus, at the completion of block 908, the parameter tables of the PPMs will describe power loss characteristics of their respective internal component associated with various operating modes.

At block 1114, with the internal components configured, the network element 1000 is coupled to the OBSLR network to receive network inputs signals from upstream nodes and to transmit processed signals to downstream nodes. The coupling and decoupling of the network element 1000 can be accomplished in several ways. The network element can be manually connected to the network, by an operator physically connecting network fiber to the network element. In an automated method, the network element is physically coupled to the data network, but the input and output signals of the network element can be independently switched on and off using switches internal to the network element. This allows a network administrator to remotely couple the network element with the data network, by sending instructions over the administrative network to control the internal switches.

Note that the following descriptions describe configuration and power management functions of the network element 1000. Although described with a perspective of configuring all the internal components of the network element, the following methods are also applicable to configuring one or more newly added internal components to an already configured network element. Thus, the following methods can be used to initially configure a network element or to configure newly added components to a previously configured element as upgrades occur.

At block 1116, the element 800 receives parameters via the OSC channel that describe the level of the input signal which will be received from an adjacent upstream node (not shown). The upstream node being the network element that transmits signals to the network element 1000. The parameters are received by the OSC controller 1036 and forwarded to the CPM. As this occurs, the CPM outputs parameters over the OSC to an adjacent downstream node. Initially the parameters indicate that no signal is presently being transmitted.

As signals are input to the network, and signal power levels are detected, one or more configuration scenarios may occur. In a first scenario, shown at A in FIG. 11, the existing configuration of the network element 1000 results in acceptable input and output signal levels for use in the data network. In a second scenario, shown at B in FIG. 11, the downstream node cannot handle the signal transmitted from the network element 1000, and so, requests a power reduction. To compensate for the excessive signal, the signal levels are adjusted in accordance with the present invention. In a third scenario, shown at C in FIG. 11, the internal component 400(4) cannot handle the signal received from the internal component 600(1), and so, requests a power reduction. To compensate for the excessive signal level, the signal level is adjusted in accordance with the present invention. The method 1100 demonstrates the three scenarios in the following description.

At block 1118, the scenario A begins when parameter information from an upstream adjacent node indicates signal levels that will be transmitted to the network element 1000. The parameters are transmitted over the OSC and received by the OSC controller 1036, which in turns forwards them to the CPM 1038. The CPM re-computes the loss parameters for the internal component 400(1) and the determines that the expected signal levels can be adequately processed by the card 400(1). The CPM stores the re-computed parameters internally.

At block 1120, the CPM re-computes the input and output loss parameters for the card 400(4) based on the updates to parameters for the card 600(1). The CPM determines that the expected signal levels can be adequately processed by the card 400(4), and so, stores the parameters associated with the card 400(4) internally.

At block 1122, the CPM re-computes the input and output loss parameters for the card 600(2) based on the updates to parameters for the card 400(4). The CPM determines that the expected signal levels can be adequately processed by the card 600(2), and so, stores the parameters associated with the card 600(2) internally.

At block 1123, the CPM has completed parameter calculations for all the internal components and downloads these parameters to the PPMs of the internal components. The PPMs may adjust their respective internal components based on the received parameters.

At block 1124, the CPM now knows the expected inputs signal level from the upstream node and the loss expected from the internal components of the network element 1000. The CPM also determines the expected output signal power levels and transmits these signal level parameters to a downstream adjacent network element. In accordance with the invention, as the power parameters propagate down the network, each network element updates its internal components' parameter tables and the resulting revised parameters are transmitted to further downstream elements in the network. For example, if power level updates to a node affect power levels transmitted from the node A, that is upstream from the network element 1000, the upstream node, then the network element 800 would update its internal components to reflect these changes and transmit the adjusted parameters to the downstream network element.

At block 1126, if different parameters are received from the upstream node, then the method 1100 proceeds on path 1128 to update the parameter tables of the internal components with the newly received parameters. If no different parameters are received, then the method 1100 continues on path 1130.

At block 1132, the data network continues to move toward stabilization. Even though no new parameters were received by the network element 1000, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

The scenario B demonstrates how signal level changes are made to accommodate inadequate signal levels. The scenario B begins when different parameters arrive at the network element 1000 from the upstream node. The different parameters indicate that the power level of the signal transmitted from the upstream node is not as expected by the network element 1000.

At block 1134, the different parameters are transmitted over the OSC and received by the OSC controller 1036, which in turns forwards them to the CPM 1038. The CPM re-computes the loss parameters for the internal component 600(1) and determines that the expected signal levels can be adequately processed by the logic of card 600(1). The CPM stores these recomputed parameters in its internal parameter table.

At block 1136, the CPM re-computes the input and output loss parameters for the card 400(4) based on the updates to parameters for the card 600(1). The CPM determines that the expected signal levels can be adequately processed by the logic of card 400(4), and so, stores these recomputed parameters in its internal parameter table.

At block 1138, the CPM re-computes the input and output loss parameters for the card 600(2) based on the updates to parameters for the card 400(4). The CPM determines that the expected signal levels can be adequately processed by the card 600(2), and so, stores these recomputed parameters in its internal parameter table.

At block 1139, the CPM has completed parameter calculations for all the internal components and downloads these parameters to the PPMs of the internal components. The PPMs may adjust their respective internal components based on the received parameters.

At block 1140, the CPM now knows the expected inputs signal level from the upstream node and the loss expected from the internal component 1000. The CPM determines expected output signal power levels and transmits these signal level parameters to a downstream adjacent network element over the OSC. In accordance with the invention, as the power parameters propagate down the network, each network element updates its internal component parameter tables and the resulting revised parameters are transmitted to the next element in the network.

At block 1142 the downstream node determines that the signal level it is to receive from the network element 1000 is too high and cannot be adequately processed. The downstream node transmits a request over the OSC to the network element 1000 to reduce its output power level. This request is received by the CPM.

At block 1144, the CPM determines if the signal level can be reduced at the card 600(2). Since the card 600(2) has the VOA 602(2) coupled to its output, it is possible that the VOA can be adjusted to attenuate the output signal to satisfy the request of the downstream node. The CPM re-computes the input and output loss parameters for the card 600(2) in order to achieve an output signal power level acceptable to the downstream node and stores these parameters in its internal memory.

At block 1146, the CPM downloads its internal parameters to the PPM associated with the internal component 600(2). The PPM updates its parameter table with the re-computed parameters.

At block 1148, the VOAC 604(2) receives the updated parameters from the parameter table via the PPM and adjusts the VOA 602(2) to introduce additional attenuation to the output signal 1020 in accordance with the new parameters, thereby reducing the signal power level to satisfy the request of the downstream node.

At block 1150, the CPM transmits the updated signal level parameters to the downstream adjacent network element over the OSC.

At block 1152, the downstream network element updates its internal components to adjust to the new input levels and propagates its new parameters to other elements in the network. Each element in the data network exchanges power parameters as describe above. This negotiation process happens over a selected time period which may vary depending on the significance of the signal level adjustments and the number of network elements affected.

At block 1126, if different parameters are received from the upstream node, then the method 1100 proceed on path 1128 to update the parameter tables of the internal components with the newly received parameters. If no different parameters are received, then the method 1100 continues on path 1130.

At block 1132, the data network continues to move toward stabilization. Even though no new parameters were received by the network element 1000, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

The scenario C demonstrates how signal level changes are made to accommodate inadequate signal levels. The scenario C begins when different parameters arrive at the network element 1000 from the upstream node. The different parameters indicate that the power level of the signal transmitted from the upstream node is not as expected by the network element 1000.

At block 1162, the different parameters are transmitted over the OSC and received by the OSC controller 1036, which in turns forwards them to the CPM 1038. The CPM re-computes the loss parameters for the internal component 600(1) and determines that the expected signal levels can be adequately processed by the logic of card 600(1). The CPM stores these recomputed parameters in its internal parameter table.

At block 1164, the CPM re-computes the input and output loss parameters for the card 400(4) based on the updates to parameters for the card 600(1). The CPM determines that the expected signal levels are too high to be adequately processed by the logic of card 400(4). The CPM then looks upstream from the card 400(4) for a way to reduce the signal level.

At block 1166, the CPM knows that the card 600(1) includes the VOA 602(1). The CPM re-computes the loss parameters for the internal component 600(1) to include additional attenuation from the VOA 602(1) to meet the power level requires of the card 400(4). The CPM stores these recomputed parameters in its internal parameter table.

At block 1168, the CPM re-computes the input and output loss parameters for the card 400(4) based on the updates to parameters for the card 600(1). The CPM determines that the expected signal levels can be adequately processed by the card 400(4), and so, stores the parameters associated with the card 400(4) internally.

At block 1169, the CPM re-computes the input and output loss parameters for the card 600(2) based on the updates to parameters for the card 400(4). The CPM determines that the expected signal levels can be adequately processed by the card 600(2), and so, stores the parameters associated with the card 600(2) internally.

At block 1170, the CPM has completed parameter calculations for all the internal components and downloads these parameters to the PPMs of the internal components. The PPMs may adjust their respective internal components based on the received parameters.

At block 1171, the VOAC 604(1) receives the updated parameters from the parameter table via the PPM and adjusts the VOA 602(1) to introduce additional attenuation to the output signal 1020 in accordance with the new parameters, thereby reducing the signal power level to satisfy the request of the card 400(4).

At block 1172, the CPM now knows the expected inputs signal level from the upstream node and the loss expected from the internal components of the network element 1000. The CPM also determines the expected output signal power levels and transmits these signal level parameters to a downstream adjacent network element. In accordance with the invention, as the power parameters propagate down the network, each network element updates its internal components' parameter tables and the resulting revised parameters are transmitted to further downstream elements in the network. For example, if power level updates to a node affect power levels transmitted from the node A, that is upstream from the network element 1000, the upstream node, then the network element 1000 would update its internal components to reflect these changes and transmit the adjusted parameters to the downstream network element.

At block 1174, the downstream network element updates its internal components to adjust to the new input levels and propagates its new parameters to other elements in the network. Each element in the data network exchanges power parameters as describe above. This negotiation process happens over a selected time period which may vary depending on the significance of the signal level adjustments and the number of network elements affected.

At block 1126, if different parameters are received from the upstream node, then the method 1100 proceeds on path 1128 to update the parameter tables of the internal components with the newly received parameters. If no different parameters are received, then the method 1100 continues on path 1130.

At block 1132, the data network continues to move toward stabilization. Even though no new parameters were received by the network element 1000, other network elements may still be updating their local parameters tables based on newly received parameter information at those nodes. Eventually, the network will completely stabilize when no different parameter information propagates to any node in the network, whereby all the network elements have stable parameter tables. At that point, the loss for every signal path in the network will be accounted for.

In the above methods, the computations performed by the CPMs can be varied to achieve specific network goals. For example, in one embodiment, the CPMs operate to include calculation of the maximum loss (or minimum power) across the all possible signal paths and operating modes, resulting in the storage of the worst case parameters in the parameter table. In this embodiment a small parameter table is required and less information needs to be exchanged between network elements, However, the use of the worst case parameters means that in certain method steps the network elements are more likely to require a power level decrease.

In the another embodiment, the computational results for all signal paths for particular operating modes are independently stored, resulting in a table with a multiplicity of entries describing the parameters for the different paths and modes. The minimum power is calculated over all paths in particular scenarios, not against all scenarios. In this embodiment, more table entries are required and more cases must be searched during a switching event to determine the correct parameters to use. More cases have to be exchanged between the networks elements. This results in the best possible SNR for the overall network. Thus, a tradeoff results between implementation complexity and SNR.

Real time management of the VOA configurations for a dynamic network might more advantageous with one embodiment, while offline calculation of VOA configurations for best SNR might use the other embodiment. The offline calculation for network configuration would use multiple instances of the algorithm described with reference to FIGS. 9 and 10, where the instances of the algorithm would simulate the computation in the various network elements being configured.

Figure 12:
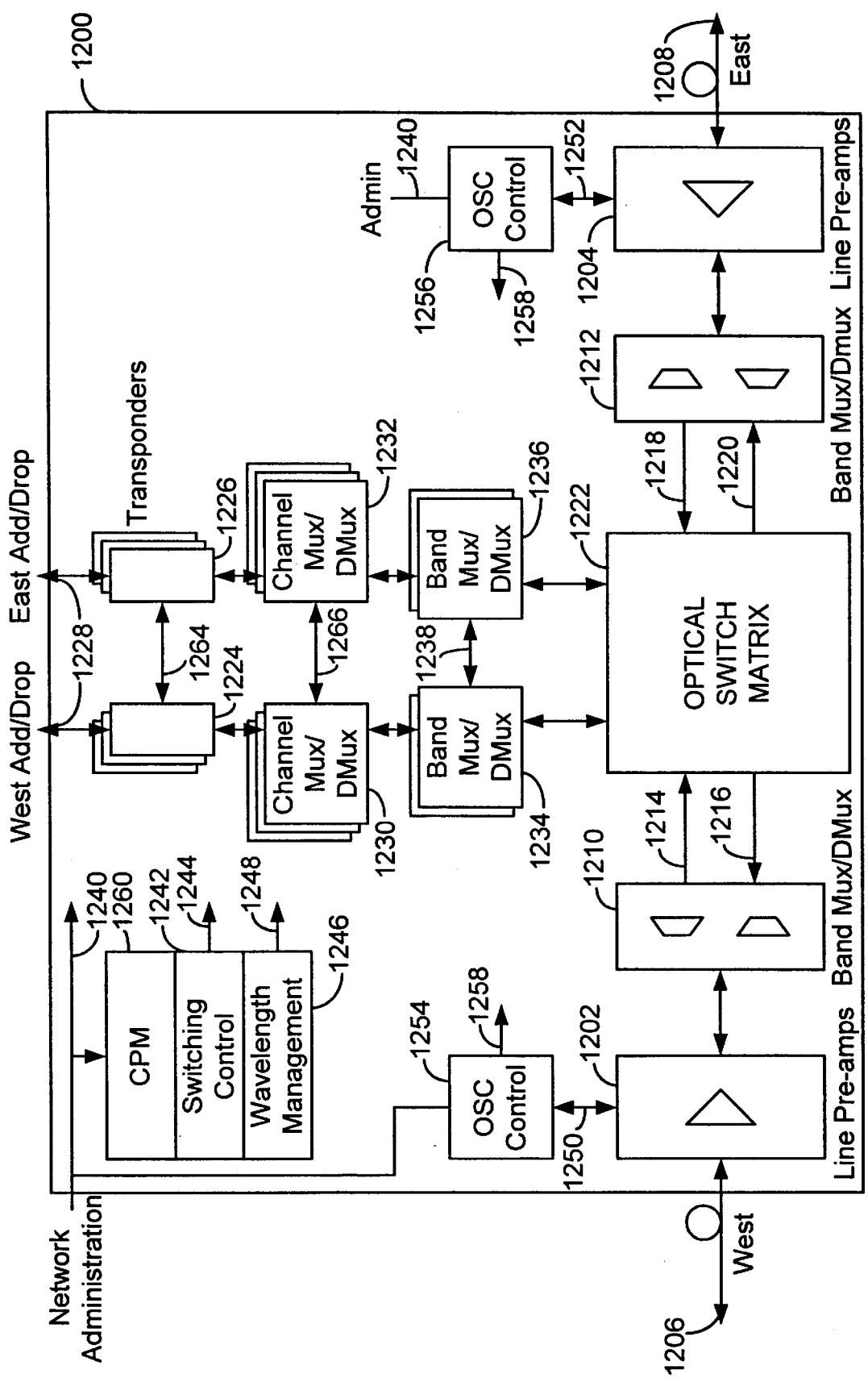
FIG. 12 shows a diagram of a third network element constructed in accordance with the present invention.

FIG. 12 shows a block diagram of a third network element 1200 constructed in accordance with the present invention. The third network element 1200 comprises several types of internal components. It will be apparent to a person skilled in the art that the internal components in the network element 1200, some of which are not described in specific detail in this document, can be constructed in accordance with the present invention in a similar fashion to other internal components discussed herein. Thus, all manner of internal components suitable for use in a network element can be constructed by incorporating various modules in accordance with the present invention.

Incorporated in the third network element 1200 are line preamps 1202 and 1204. The line preamp 1202 receives and transmits optical signals over west optical fiber 1206 and the line preamp 1204 receives and transmits optical signals over east optical fiber 1208. Coupled to the line preamps are channel Mux/Demux modules 1210 and 1212. The channel Mux/Demux 1210 couples to the line preamp 1202 and demultiplexes the received input signal into working and protect signals shown at 1214. The channel Mux/Demux 1210 also receives working and protect signals shown at 1216 and multiplexes them into an output signal for transmission by the line preamp 1202. The channel Mux/Demux 1212 couples to the line preamp 1204 and demultiplexes the received input signal into working and protect signals shown at 1218. The channel Mux/Demux 1212 also receives working and protect signals shown at 1220 and multiplexes them into an output signal for transmission by the line preamp 1204.

An optical switch matrix 1222 is used by the network element 1200 to switch signal paths of optical signals received from the east and west fibers 1206, 1208. The optical switch matrix 1222 also switches signal paths of optical signals received from west transponders 1224 and east transponders 1226. The transponders provide a way for optical signals to be dropped from the optical network so that they may be received as local signals 1228. The transponders also provide a way for local signals 1228 to be added to the optical network for transmission to other network elements.

The transponders 1224, 1226 couple to channel Mux/Demux 1230 and 1232, respectively. The channel Mux/Demux 1230, 1232 couple to band Mux/Demux 1234, 1236 respectively. The band Mux/Demux 1234, 1236 couple to the optical switch matrix 1222. The signal paths from the transponders to the optical switch matrix allows signals to be added or dropped from the optical network. For example, a local signal received at west transponders 1224 may be multiplex together with other signals at channel Mux/

Demux 1230 and then may be multiplexed into a signal band at band Mux/Demux 1234. This signal band may be added to the optical signal path via the optical switch matrix 1222 for transmission on the west fiber 1206. Similarly, signals received from the west fiber 1206 may be dropped from the network by following the reverse path to the west transponders 1224. The east transponders provide the same finctionality for signal on the east fiber 1208.

A band coupling 1238 between the band Mux/Demux 1234 and 1236 provides and an additional signal path to allow signals to cross over from the west side to the east side. This, in effect, provides a by-pass mode of operation. Serving a similar function are channel coupling 1266 and transponder coupling 1264.

The network element 1200 also couples to a network administration bus 1240 to allow a network administrative entity to communicate with the modules of the network element 1200. A switching control module 1242 is provided within the network element that couples to the administrative bus 1240. The switching control module 1242 receives network switching information and distributes the switching information to selected modules in the network element via a switching bus 1244. A wavelength management module 1246 couples to the administrative bus 1240 and receives wavelength information about signals transmitted over the optical network. The wavelength management module 1246 distributes the wavelength information to selected modules within the network element 1200 via a wavelength management bus 1248.

A CPM module 1260 is also coupled to the administrative bus 1240 to allow configuration parameters to be downloaded from the network entity to the CPM. The CPM control power management within the element 1200 and communicates with PPMs associated with each module (not shown).

The line preamp 1202 operates to multiplex and demultiplex an OSC channel 1250 with the west transmitted and received optical signals. The line preamp 1204 functions to multiplex and demultiplex an OSC channel 1252 with the east transmitted and received optical signals. The OSC channels are coupled to OSC controllers 1254 and 1256. The OSC controllers distribute information received from other network elements to the internal components of the network element 1200 via an OSC control bus 1258. The OSC controllers also receive information from the CPM for transmission to other network elements. Thus, information parameters can be exchanged between the internal components of the network element and other elements in the optical network via the OSC channel.

All of the internal components of the network element 1200 include PPMs (not shown). The PPMs couple to the administrative bus 1240 to receive configuration parameters from the administrative entity. The configuration parameters are used to configure each of the internal components, so that based on an operating mode, selected input signals are used to produce selected output signals. Several operating modes may be configured. For each of the configured operating modes input and output power parameters for each of the internal components are determined. The power parameters at any particular component represent the signal loss through the component as a result of how it is configured.

Figure 13:
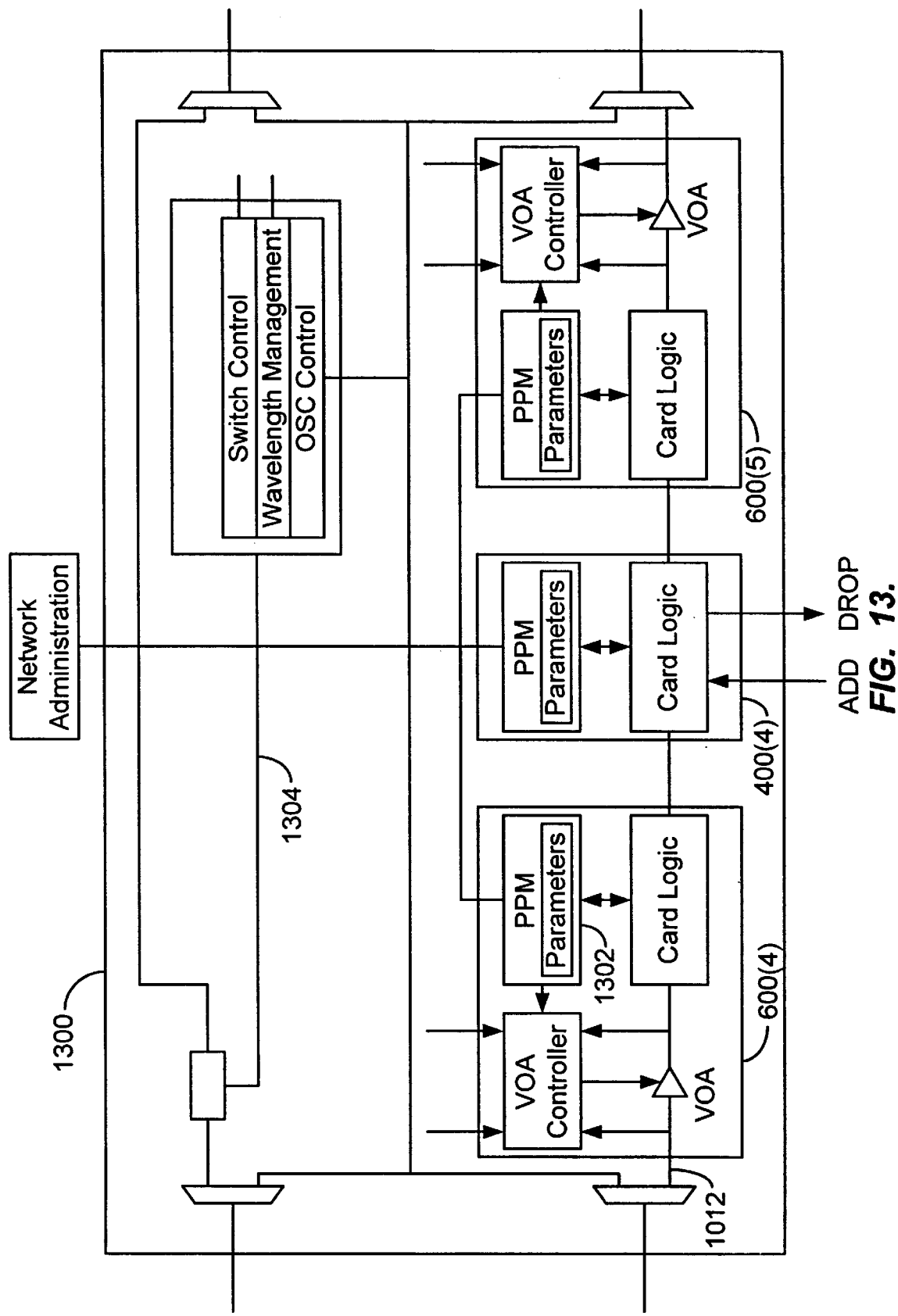
FIG. 13 shows a diagram of a network element constructed in accordance with the present invention.

FIG. 13 shows an embodiment of a network element 1300 constructed in accordance with the present invention. The network element 1300 includes internal components 600(4), 600(5) and 400(5). Each of the internal components includes a PM module constructed in accordance with the present invention. The PM modules operate to provide power management in a manner similar to the way it is provided in the network element 1000.

In the network element 1300, the PM modules act as stand alone modules to implement power management strategies at each internal component. For example, the PM 1302 module operates to perform power management functions for the internal component 600(4). The PM 1302 then communicates power parameters over an administrative bus 1304 to other PMs in the network element. The PMs in cards located at the upstream and downstream end of the network element, communicate power parameters to adjacent upstream and downstream network elements, respectively.

Figure 14:
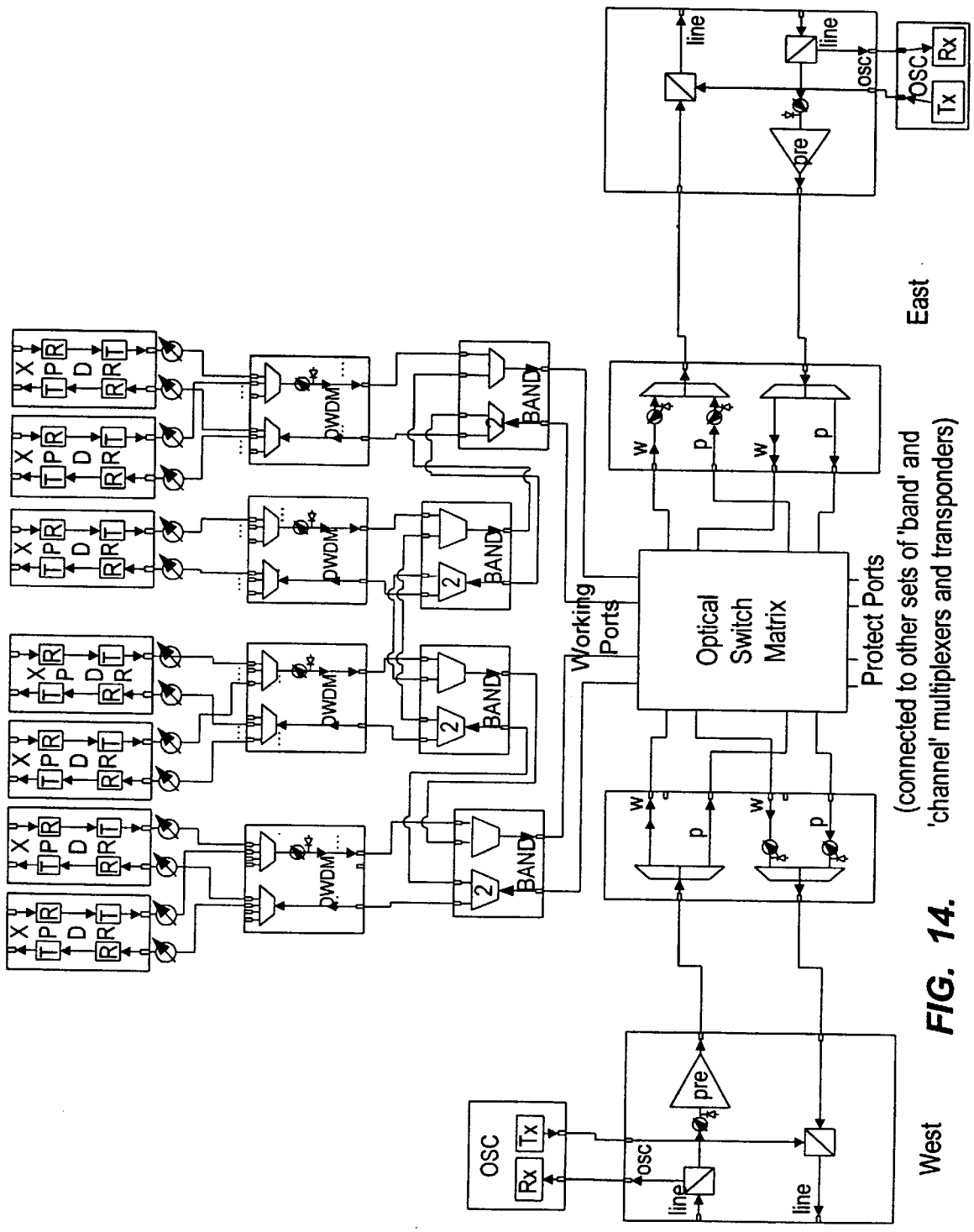
FIG. 14 shows a detailed embodiment of the network element of FIG. 12.
Figure 15:
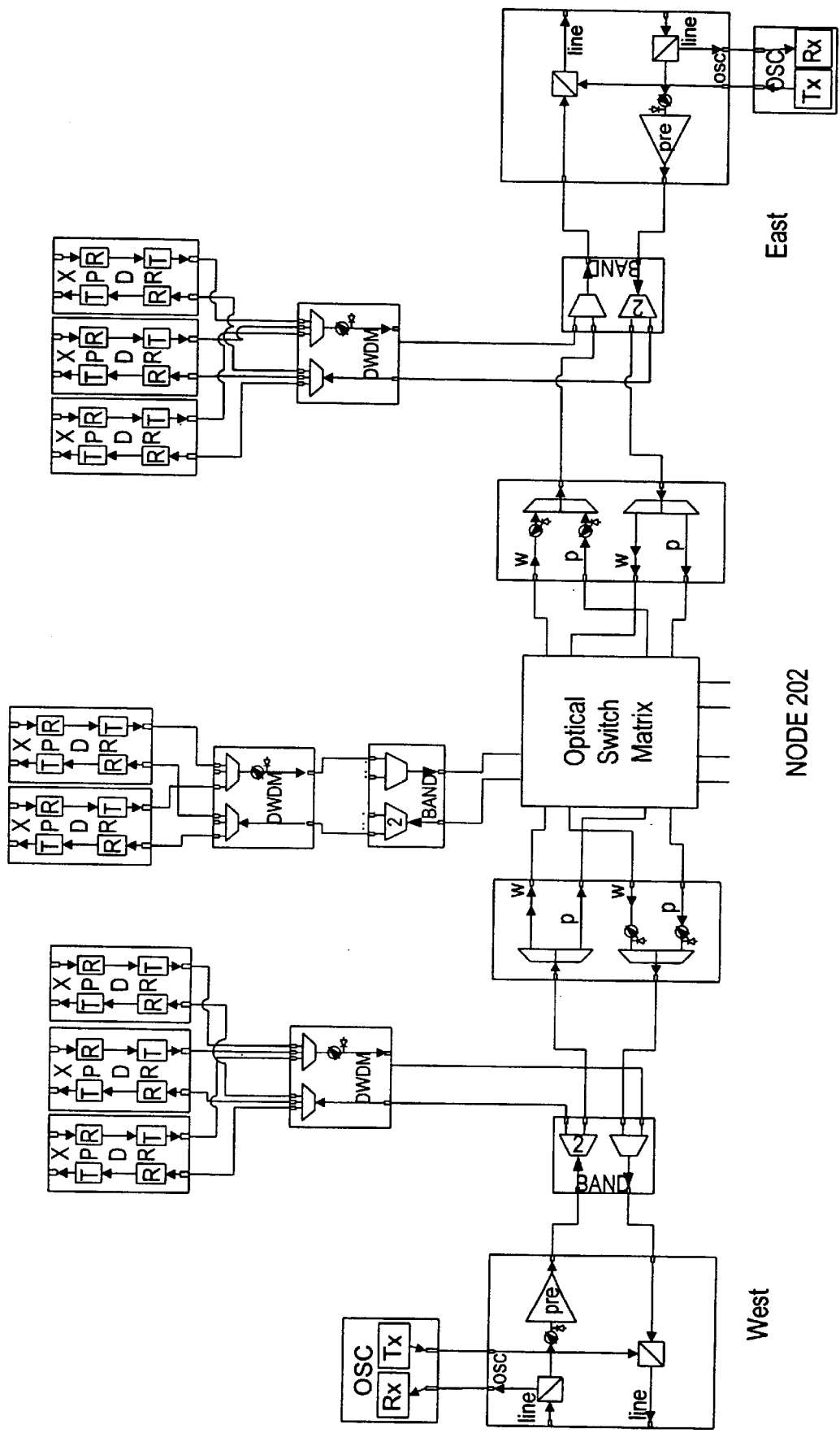
FIGS. 15–18 show detailed embodiments of the network elements of FIG. 3.
Figure 16:
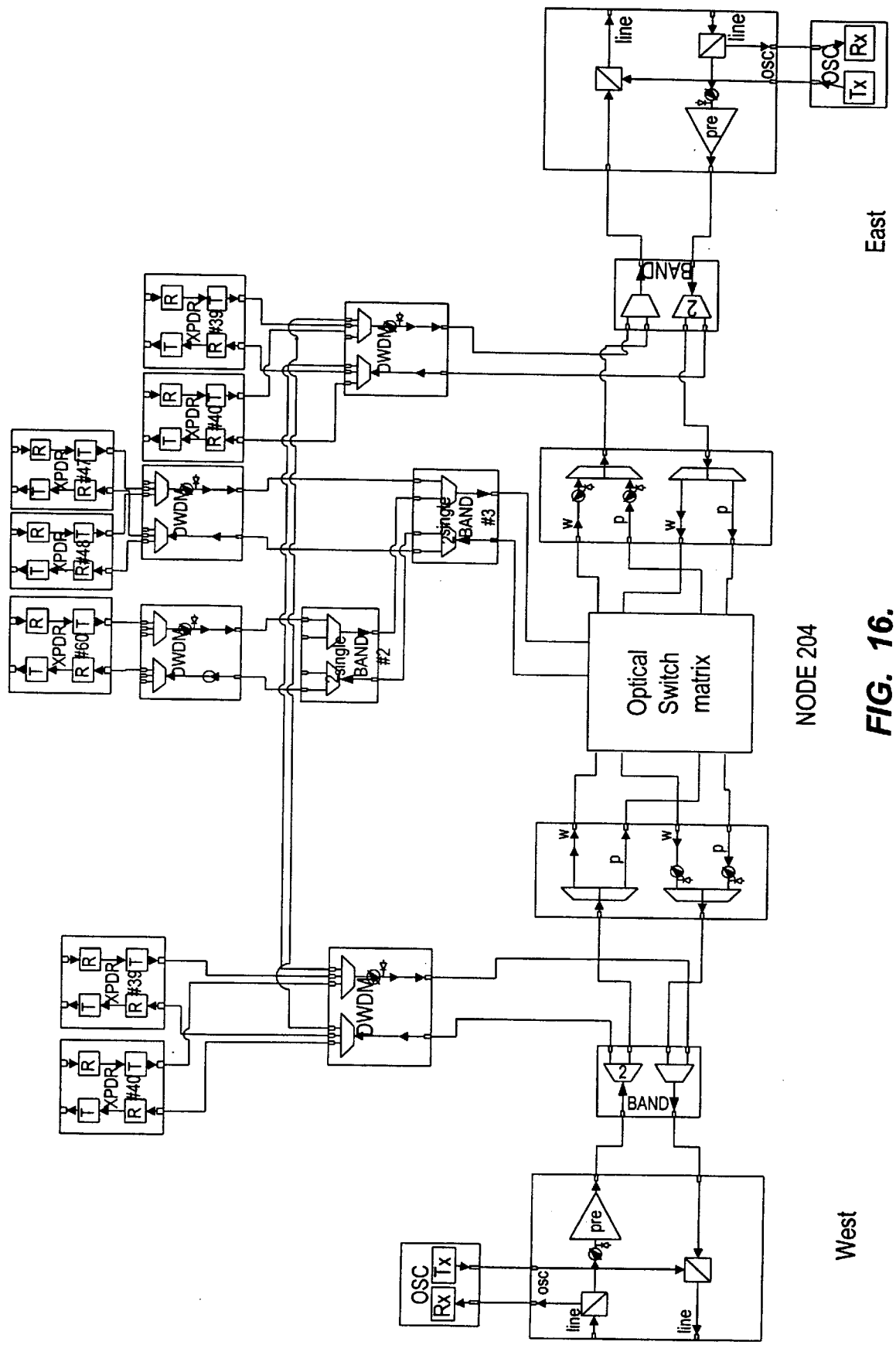
Figure 17:
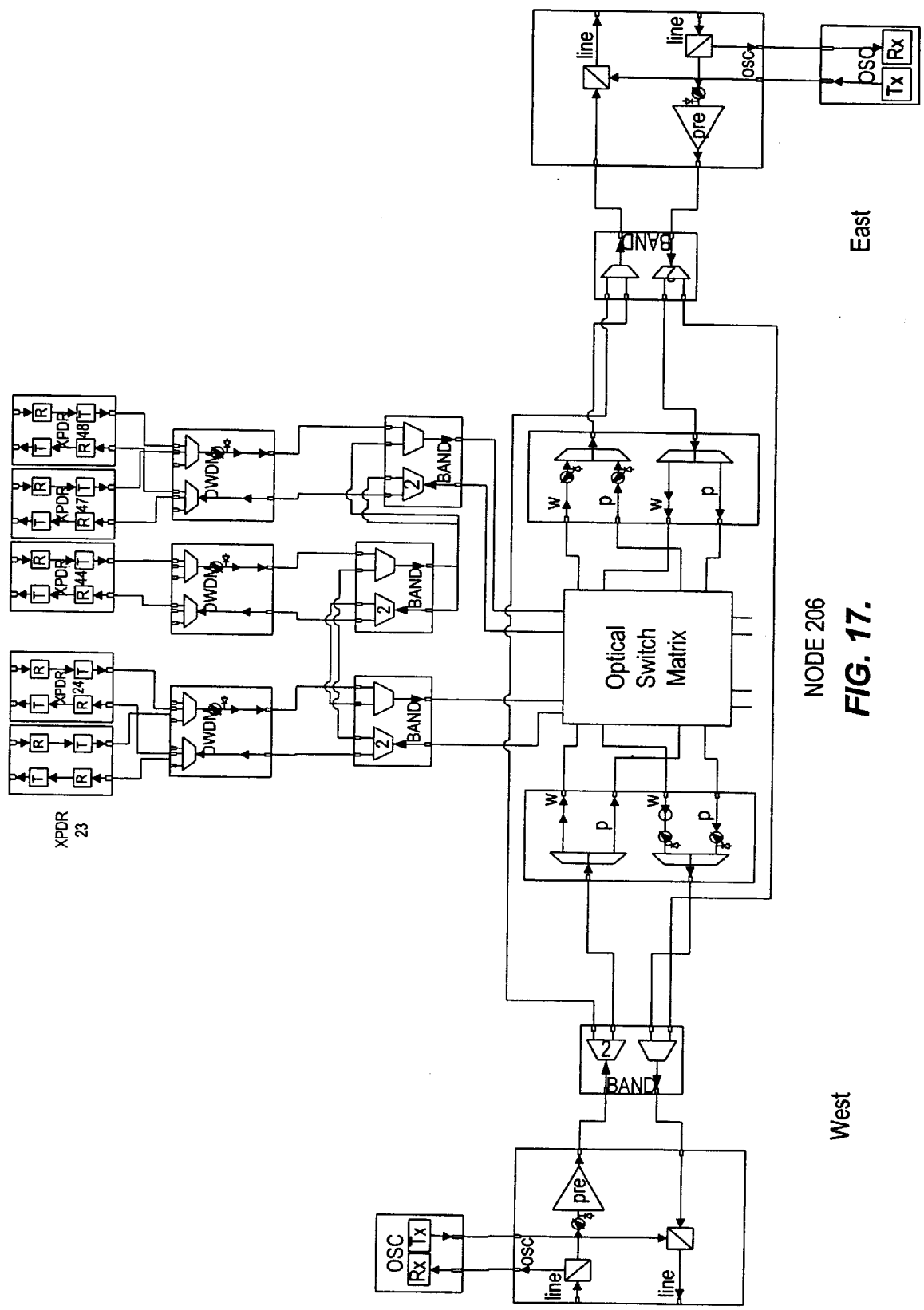
Figure 18:
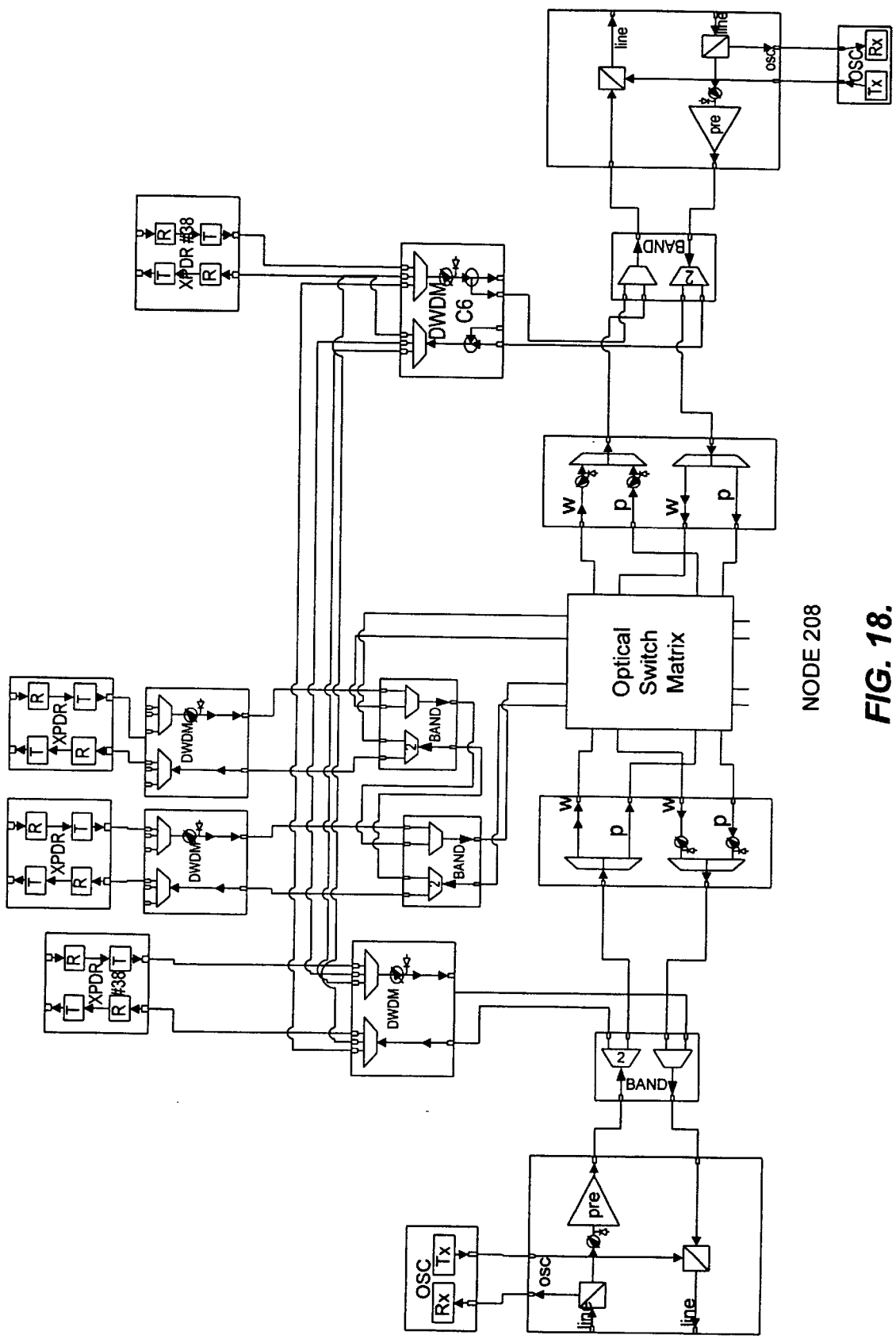

FIG. 14 shows a detailed configuration of the network element 1200 constructed in accordance with the present invention. Several VOAs are incorporated into the network element 1200, for example at 1402, 1404 and 1406.

FIGS. 15–18 shows a detailed configurations of the network elements 202, 204, 206 and 208, respectively. The four network elements illustrate different configurations of internal components and VOAs that are all suitable embodiments of the present invention. It will be apparent to a person with skill in the art that other configurations of network elements are possible without deviating from the scope of the present invention.

Addition of a Network Node

In one embodiment of the present invention, modifications to the power management algorithm support node upgrades. For example, if a node is added to the network, the power management algorithm adjusts to allow a smooth transition of power levels.

The basic strategy of the power management algorithm is to maintain constant output power per wavelength between network elements. There are conditions, though, that cause these power "boundaries" to change (i.e. in support for upgrades of network elements to add/remove bands or add/remove complete network elements from the ring). Whenever one of these conditions occurs, the output power per wavelength from each network element may be required to change.

To prevent disruption of traffic during an upgrade scenario, the power management algorithm allows power levels between network elements to change, but enforces a slow migration from the current converged set of network power level and associated VOA attenuation values within each network element, to a new set. The basis for this migration is that the starting, migrating, and ending power levels and associated VOA settings all support traffic in the network. For example, while the VOA settings are adjusted between the steady-state levels before and after the upgrade, network traffic is constantly supported.

When a new node is added (or removed) from the ring, the network elements are updated with new connectivity information and send indications over the OSC channel to neighboring nodes as new wavelength output power levels are computed. The ring will iterate until it converges on a new set of steady-state power levels and associated VOA settings (a 2 second hysteresis hold-off is implemented to ensure the loop has converged before notifying VOAs of new target values).

While the convergence occurs, the ring continues to operate with the original set of VOA attenuation values, thus supporting traffic in the network while computing the new values. Once the ring converges on the new values, the local VOA control loops are notified of new target values for each switch condition. The VOA Control loops enforce the slow migration by moving to the new target attenuation values over 40 increments spaced 200 milliseconds apart. This slow slew rate ensures that no power surges occur in the network to disrupt traffic as the network moves to a new power profile. During this migration network traffic is supported, and this support is maintained while the VOAs increment to their final settings. When the VOAs reach their final settings, the network stabilizes at the new set of converged values, thus completing the upgrade without affecting the flow of traffic in the network.

Wavelength Provisioning

The objective is to allow cards to be added and interconnected without a central TC application to coordinate power levels between cards. The levels specified in and out of each card are encapsulated in the cross-connect and upstream/downstream connection models for that card.

Just provisioning a card in the system has no affect on power levels between cards. Only when a connection is defined (e.g. cross-connect or upstream/downstream connectivity pointers) do cards exchange power information to set the average power levels between them.

A card's average output specifies the average input for the downstream card. As the input level changes for a card, it computes a new average output using the nominal loss through the card. This change is communicated to the next card if a connection exists. These power updates ripple through connected cards as upstream connections are made and allow cards to be provisioned and connected in any order.

Local Power Management

The following description provides information on local power management issues.

Each node around the ring knows input and output average wavelength power levels from/to neighbors.

A node manages power internally using its VOAs to adjust power levels for a constant output power per wavelength to a downstream node.

The Power Management modules (or proxy PMs) associated with cards within a node exchange power level information whenever a connection is made between two points. This includes the power level expected during normal working, equipment protection, ring protection, ring switched, and ring protect passthru.

Local power management maintains loss information for all the internal cross connections of a circuit pack. For each connection, the output power level for each switching condition is computed using this cross connection loss.

In one embodiment, the output level is computed as the minimum power level resulting over various paths for normal working, equipment protection, ring protection passthru, ring protection switched (both the working and protect paths), or equipment protect scenarios. The minimum resulting output power level sets the guaranteed output wavelength power from the node. Usually, this result from a ring protection condition and means that for normal operation, both the Working and Protect VOAs are adjusting the transmit power to this output level.

In another embodiment, the output power level is computed to produce the best possible SNR for the overall network.

In another embodiment, the output power levels for some or all network switching events are pre-computed and stored. Each network element can access these pre-computed values to quickly adapt to changing network conditions.

FIG. 19 illustrates ten paths that are considered during power management.

Working traffic added on same side of network element.

Working traffic added on opposite side of network element and switched back during ring protection switch.

Working traffic passthru (should be equalized to working traffic added on the same side of the network element).

Protect traffic switched back to working (ring protection switch)

Working traffic switched back to protect (ring protection switch)

Protect traffic passthru (ring protection passthru).

Protect access traffic add same side

Protect access traffic passthru,

Working traffic added on same side during equipment protection.

Working traffic passthru during equipment protection

In the case of a passthru node, the ring protect switch case involves analyzing two paths—incoming working traffic switched back onto the protect path and incoming protect traffic switched back onto the working path. These paths offer differing losses to the incoming signal because the BWDM modules have different directional losses.

A node maintains a constant average output power. The only time a network element output power level may change is during a configuration upgrade in the network (e.g. adding a Band or inserting a new network element). When a configuration change causes the output level to change, the node signals downstream neighbor to re-compute internal power levels using new input value. This may cause each network element in the ring to re-converge on a new set of power levels (i.e. new internal OVA settings for each switch condition).

A node continuously monitors changes in input power level. When a change occurs, all internal paths adjust input/output levels per card. The adjustments along the path may cause the WPS to set a new node output level. This change is signaled to the downstream neighbor. Changes propagate around ring until all node input/output levels converge.

To avoid any impact on traffic, all internal VOA attenuation settings that update as a result of a re-convergence are changed slowly from the original settings to the new settings.

Ring switch does not result in power level changes in real time. Output levels are preset based on worst-case ring switch scenario.

Each card maintains the following power level information for every interface it has:

Input level received from connection during normal, equipment, ring switch local, ring switch passthru; and Output level transmitted to connection during normal, equipment, ring switch local, ring switch passthru.

When a connection is made between two interfaces, the cards are notified of their neighbors by the Administrative entity.

When received, a card power model determines any restrictions (e.g. BWDM may notify CWDM output is too high if required to match passthru channels) and either acknowledges the change to the power levels, or instructs the sending power model of any required changes to adhere to any restrictions. If sending card can't meet requested level, it sets an alarm condition.

The output of the Preamp module requires the consideration of four possible restraints to determine the output level for a connection:

1. The gain of the amplifier for the wavelength input levels.
   Pout=Pin+G
2. The power saturation level for the EDFA module.
   $Pin < EDFAout - G - 10 \log_{10} (Nchns*Nmax)$
   Where:
   Pin is the maximum amplifier input;
   EDFAout is the maximum amplifier output;
   G is the amplifier gain;
   Nmax=Maximum number of Bands through the Amplifier.
   Using the relationship in the previous step, Pout can be solved as;
   $Pout = EDFAout - 10 \log_{10} (Nchns*Nmax)$
3. An equalization of the amplifier output level with that of the first band added on the opposite side of a passthru node. This prevents unequal wavelength powers between passthru bands and added bands for the normal case of working traffic passing through the node.
   For example, an upstream node is instructed to reduce output power if the incoming level is too high to match added traffic on the other side of the network element.
   Pout-Passthru_loss_from_amplifier= Transmitter_power-add_loss
4. An equalization of the amplifier output level with that of the first band added on the same side of a passthru node through the loopback in the RSM. This prevents unequal wavelength powers between passthru bands and added bands when the node is in a ring switch mode and protect traffic is looped back to the working traffic.
   Pout-Passthru_loss_from_amplifier= Transmitter_power-add_loss The Preamp output level must be set to the minimum of these possible output levels:
   Pout=MIN (Pin+Gain, EDFAout-10 $\log_{10}$ (Nchns*Nmax),
   Opposite_Transmitter_power-add_loss+ Passthru_loss_from_amplifier,
   Near_transmitter power-add_loss+Passthru_ loss_from_amplifier)

Figure 20:
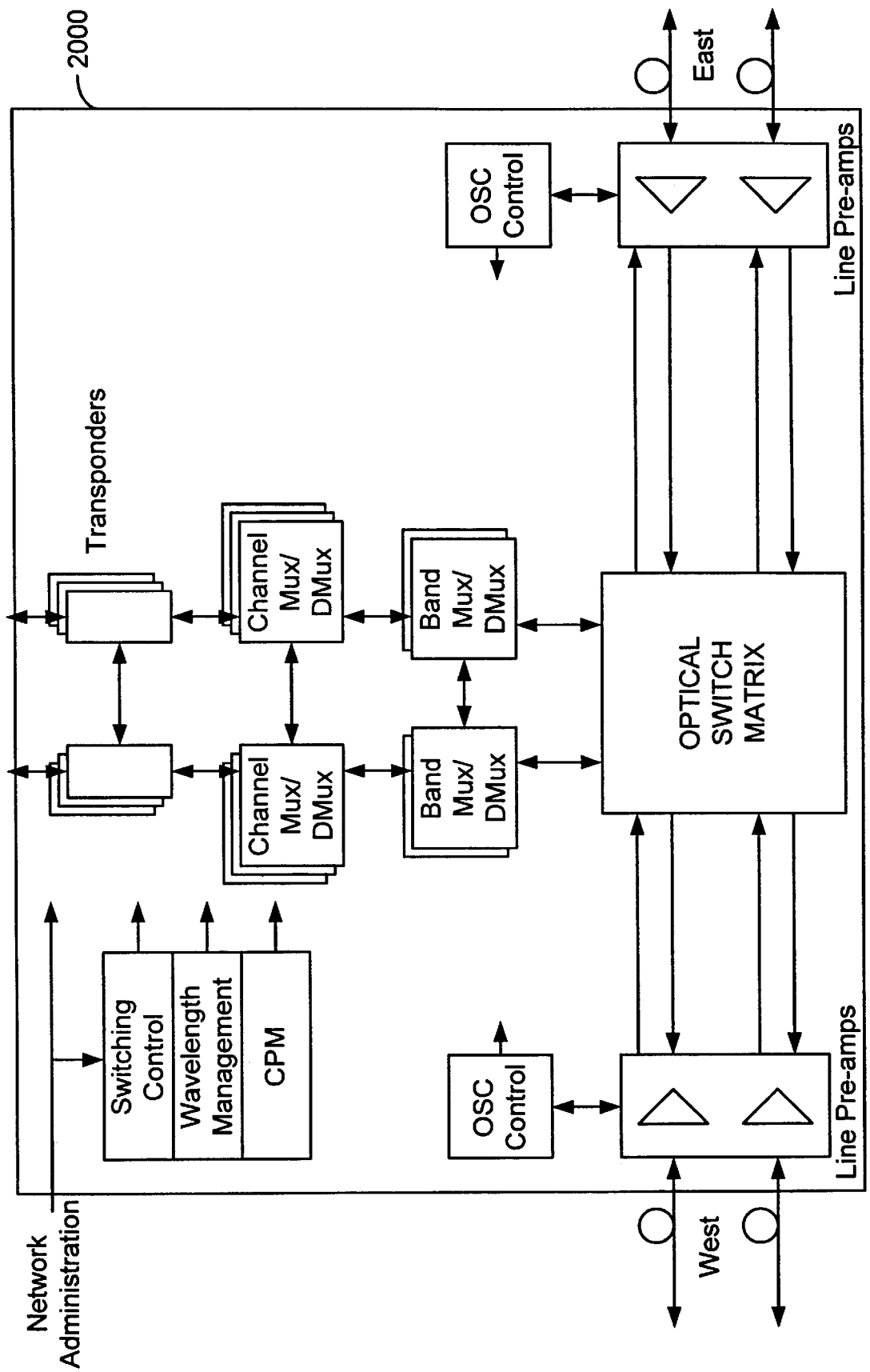
FIG. 20 shows a diagram of a network element constructed in accordance with the present invention for use in a four fiber optical network.

FIG. 20 shows a diagram of a network element 2000 constructed in accordance with the present invention. The network 2000 can perform all of the power management techniques disclosed above with respect to a two fiber network element. Thus, it is possible to construct a four fiber optical network that includes systems, components, and power management strategies in accordance with the present.

Exemplary Embodiment

An exemplary embodiment of an optical power management system included in the present invention will now be discussed. The optical power management system allows an optical network to reconfigure with no bit error rate (BER) degradation on unswitched channels and a restoration time typically under 50 ms for switched channels. The implementation is provided for a 2-fiber bidirectional line switched ring (BLSR) where optical switching serves as the prime restoration mechanism.

This embodiment achieves minimal channel disruption by trying to maintain the optical power per channel for all channels at a constant level regardless of the path the channel travels. If the OSNR of each channel is within an acceptable range, the BER for a channel will also be within an acceptable range. Thus, channel integrity is maintained when the optical path of a channel changes. The received power and OSNR at a receiver are held within an acceptable range by network control of EDFA and VOA settings.

Implementation Details

This embodiment is implemented in two stages. First, the network configuration is defined. This involves specifying the number of nodes, the traffic pattern, the link parameters and the hardware required at each node. The first stage also includes determining the various settings of VOA and erbium doped fiber amplifier (EDFA) target values. The second stage involves initializing the network and turning on the traffic. Optical power control within the network is dominated by the closing/opening of the VOA and EDFA control loops. Once the network has initialized, it is ready to handle failure and restoration events.

Figure 21:
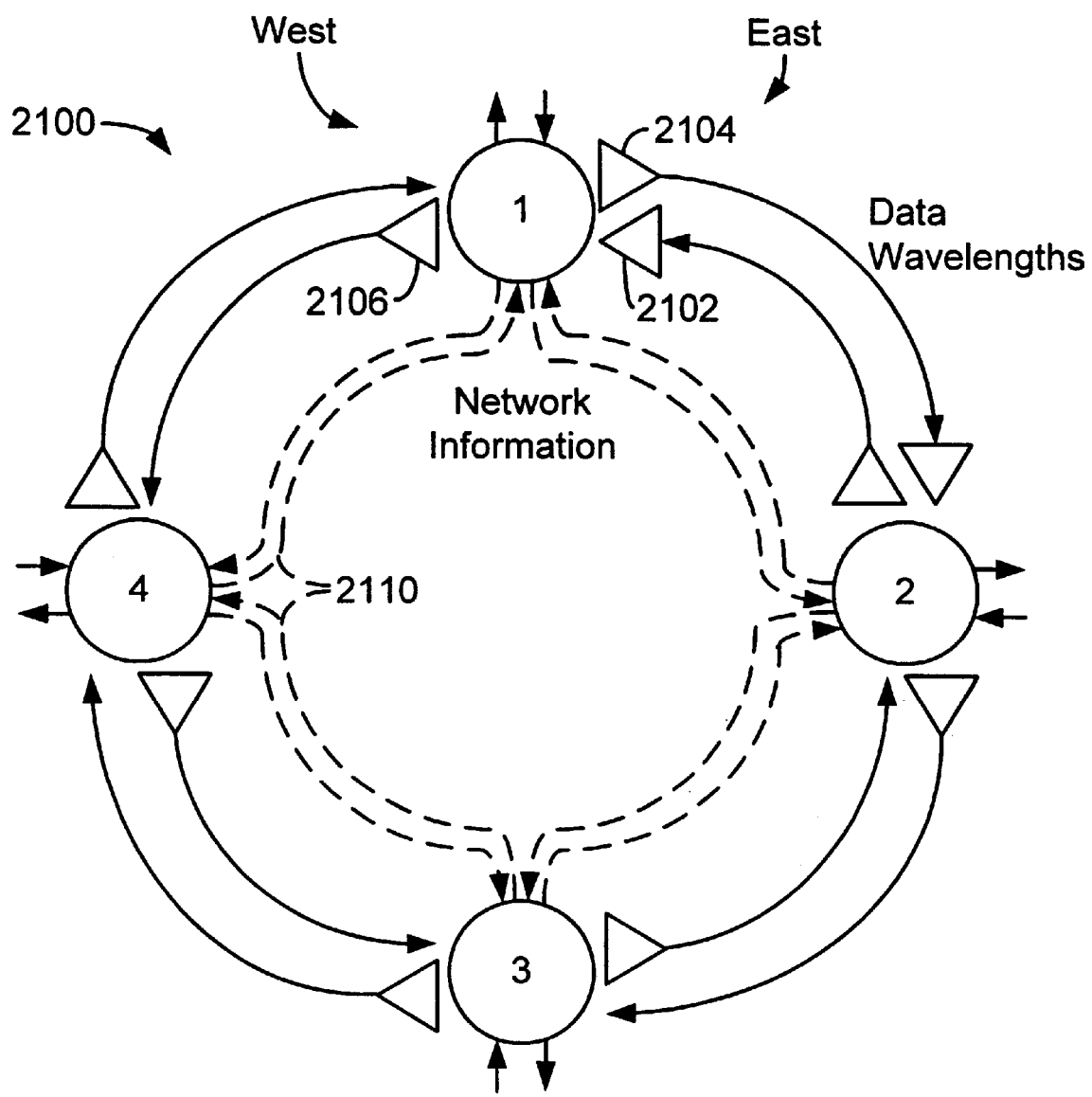
FIG. 21 shows a four node 2 fiber BLSR network constructed in accordance with the present invention.

In the first stage, the network is designed based on the required traffic pattern. As an example, this embodiment will be discussed with reference to a four node ring 2100 representing a 2-fiber BLSR network as shown in FIG. 21. In ring 2100, one fiber carries clockwise (CW) traffic while the other carries counter-clockwise (CCW) traffic. Traffic is added and dropped at each node with network information passed around the ring on a separate optical service channel. The protection and working capacity are divided between the available bandwidth of one fiber. As a result, in a WDM system, the number of channels available in a fiber is divided between the working and protection channels.

In a network of this nature, failures such as equipment problems and fiber breaks are protected against by routing the affected working channels in the opposite direction around the ring, using protection channel capacity. As a result, the number of channels in a fiber can vary during these events. As well, the path that a given traffic channel takes from a particular transmitter (Tx) to a particular receiver (Rx) can also vary.

In order to solve these issues of varying channel count and varying path loss, a combination of EDFAs and VOAs are used throughout the network to provide calculated amounts of gain and attenuation where required. The end goal is to establish a network where all channels maintain an acceptable BER independent of the different paths taken during the operation of the network. As shown in FIG. 21, preamps and/or postamps may be used on incoming and outgoing fibers respectively to provide gain. For example, Node 1 shows a preamp 2102 and postamp 2104 on its East side but only a postamp 2106 on its West side. The assignment of amplifiers is dependent upon the span loss and component insertion loss between a selected Tx and Rx. The procedure used to determine placement of EDFAs is primarily dependent upon span loss and insertion loss of passive components at a node.

One important aspect of the EDFA operation in this embodiment is that they are gain locked and gain flattened. Utilizing an amplifier of this nature ensures all channels experience similar gain for a variation in input power. This approach ensures minimal gain tilt in the amplifier. Further, the EDFA can handle input power level fluctuations created by dynamic channel add/drop and total fiber failures and restorations.

Figure 22:
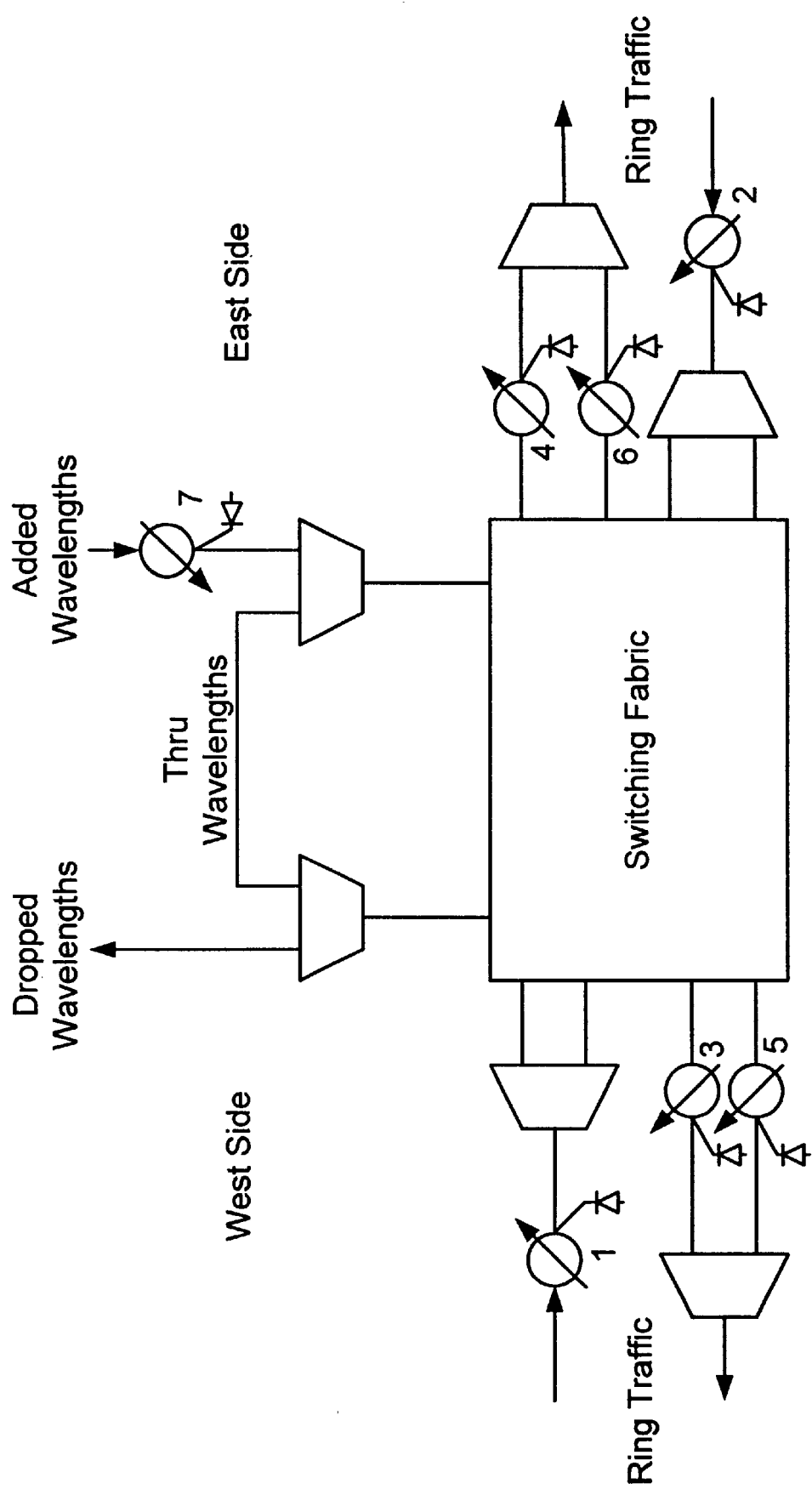
FIG. 22 shows a diagram of a node included in the network of FIG. 21.

The second major control mechanism in the network is the VOA. The VOA provides a variable level of attenuation for all channels passing through it. The placement of VOAs at a node is shown in FIG. 22.

Within a node, a VOA is placed both on the incoming traffic and the outgoing traffic on both sides of the node. In this embodiment, the VOA on the incoming side attenuates all channels. This is shown as VOA 1 and 2 in FIG. 22. For the outgoing side, two VOAs are used followed by a multiplexer. This is shown as VOA pairs 3,5 and 4,6 in FIG. 22. This pair provides the option to attenuate two subsets of channels by different amounts before they are multiplexed. In this embodiment, the protection and working channels are the subsets. The switching fabric determines which protection and working channels are routed out of the node on both the East and West side. The incoming VOA, listed as 7 in FIG. 22, is also used to prevent overload of a preamp at the node. The outgoing VOAs can be used to prevent overload of a postamp used at the node. An additional VOA is used following the added channels in order set the new channels to a power level, which is compatible with channels incoming from the fibers but not being dropped and passed through the node. A combination of multiplexers and demultiplexers are used to combine and separate the various optical wavelengths on the add and drop side of the node.

In order to protect against failure events, the traffic in a BLSR network is switched away from the failure point. Thus, each node must consider four cases:

1) Normal.
2) Ring switch away from the east side.
3) Ring switch away from the west side.
4) Tandem case where there is a switch some where else in the network but not this node.

Each of these cases can cause the number of channels in each VOA at a node to change as well as the optical power for each channel into the VOA. In order to ensure traffic continuity for all channels, a given VOA is set to a different attenuation depending on which case the node is in. Depending on the nature of the network, a given VOA may have a different optimal setting for each of the four cases. On the other hand, the situations may exist where a VOA may have the same setting for more than one case.

In order to determine VOA target values for each case, the path performance for each channel under all different switch scenarios is analyzed. When determining the path performance of each channel, the fiber and component losses are either measured or estimated. As a result, an optimal attenuation is determined for each VOA for all four scenarios. In many cases, the attenuation value for a VOA is the same for a number of cases and as a result, the VOA will commonly jump between only two target values.

Figure 23:
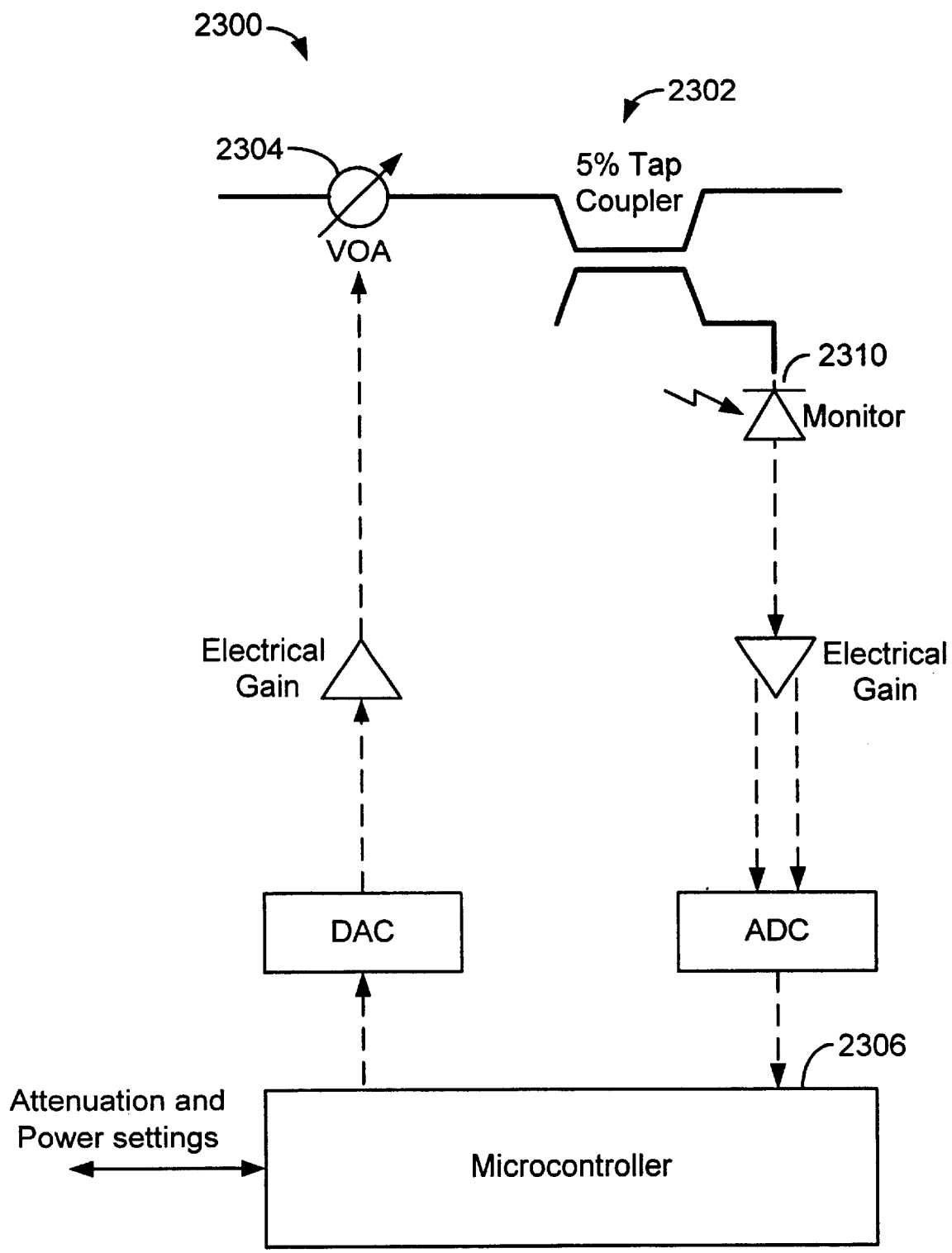
FIG. 23 shows a diagram of a VOA control loop constructed in accordance with the present invention.

These target values can be stored as attenuation values or as an optical power per channel. In order to handle these two variations, a circuit 2300 for the VOA is implemented as shown in FIG. 23. In this circuit, a tap coupler 2302 follows the VOA 2304 with a PIN detector 2310 used to measure the total optical power at the output of the VOA 2304. The PIN detector output is sampled with an analog to digital converter (ADC). The result is processed by a microcontroller 2306. When the microcontroller has information regarding the number of channels through the VOA, it can determine the power per channel. This information is passed from a CPU associated with the node to the microcontroller in the form of new target attenuation's and optical power settings. The attenuation of the VOA is set by the microcontroller via a digital to analog converter (DAC) and subsequent gain.

For the design shown in FIG. 23, both the VOA input and the PIN output are calibrated. This allows two modes of operation for the VOA control loop. The first is open loop where the VOA provides a target attenuation value. In this case, the PIN is not used. The second mode of operation is where the VOA attempts to provide a constant output power. In this case, the PIN is used as a feedback mechanism, thus creating a closed control loop. Depending on the network requirements, the VOA circuit may use one or both of the open and closed loop capabilities of the circuit.

When the VOA is in attenuation mode, the control loop is open and the VOA is driven to a pre-calibrated value. When the VOA is in power control mode, the control loop is closed and the detector circuit provides the feedback. In this mode, attempts are made to hold the output power for the VOA constant for changes at the input.

Information regarding the switching events occurring in the network is passed around the ring so that all nodes are made aware of the path changes occurring for a wavelength. As shown in FIG. 21, this information is transmitted around the ring on a separate channel, specifically, an optical service channel 2110. Once each node has an update on it's status, the new target attenuations and power levels are loaded and converged upon.

In this network, situations can exist where a protection event occurs at a node and the effect of the changes in channel count and channel power at a VOA can precede the arrival of the network information passed around the ring through the optical service channel. In events like these, a VOA at a downstream node will see an optical power fluctuation before it is notified of the change through the optical service channel. In order to handle this type of case, an algorithm is implemented where the VOA control loop will, if operating in closed loop mode, open to it's current attenuation, if it sees a power delta beyond a certain value at the detector. The control loop will hold this attenuation until it is notified of the new network status or until a timer has expired and the input is stable again. If a new target power value is provided, the loop in closed and the new output power is converged to. The general algorithm is:

A) When the VOA is operated in open loop mode, the VOA is driven to a predetermined attenuation and the drive level is only updated by the microcontroller. The VOA setting is not affected by changes in input power.

B) When the VOA is operated in closed loop mode, the algorithm is as follows:
1) Startup is in open loop mode with a predetermined attenuation
2) Once the input to the VOA has stabilized, the VOA control loop is closed and the VOA is adjusted until the target output power is converged upon.
3) If there is a power delta larger than X dB at the input, the VOA switches to open loop mode and holds it's current attenuation.
4) If there is a protecton or restoration event, updated target attenuation is sent to the VOA first. Second, a new target output power is sent to the VOA. After a period of Y ms, the VOA control loop closes and converges on the new optical output power.

An additional feature included as part of this embodiment is that the VOA on the incoming side of the node accounts for link loss variations. When this VOA is operated in closed loop mode, changes in the fiber span loss can be accounted for with the VOA, provided the VOA is not already at minimum attenuation.

The end result of using this strategy of EDFAs and VOAs is that the continuity of channels can be maintained in an optically switched network where the physical path of the channels changes to protect against failures.

This embodiment includes the following features.
1) The implementation uses a combination of open and closed VOA control loops to maintain constant attenuation and constant optical power per channel out of the VOA for cases when information regarding the number of channels through the VOA is both known and unknown.

2) A unique algorithm is used to determine the migration between closed loop and open loop VOA operation. The algorithm is based on power deltas at the input to the VOA and also network information sent to the microprocessor controlling the VOA loop.

3) A unique algorithm is used to maintain a constant received optical power at a receiver for all channels regardless of the optical path the channel took from a transmitter to a receiver.

4) The network is precalibrated for optical path loss. Specifically, the optical path loss for all channels is either measured or estimated with these values being used to set the VOA under open and closed loop conditions for the various switch states a node may be in.

The present invention provides a method and apparatus for managing power levels in an optical network. It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method for managing signal power levels of optical signals in an optical network, wherein the optical network comprises a plurality of nodes having logic to receive and transmit the optical signals over a plurality of optical fibers, the method comprising steps of:

providing each of the nodes configuration parameters;

configuring each of the nodes based on the configuration parameters;

exchanging power parameter information between the nodes;

re-configuring at least some nodes based on the power parameter information; and repeating the steps of exchanging and re-configuring until the optical network is fully configured so that the optical signals have selected signal power levels.

2. A method for managing signal power levels of optical signals in an optical network so that the optical signals have selected power characteristics, wherein the optical network comprises a plurality of nodes that receive and transmit the optical signals over optical fibers, the method comprising steps of:

configuring one or more nodes based on configuration parameters;

accessing power parameters relative to one or more nodes;

determining from the accessed power parameters if the optical network is filly configured so that the optical signals have the selected power characteristics; and re-configuring one or more nodes, when the optical signals do not have the selected power characteristics.

3. The method of claim 2, further comprising a step of repeating the steps of accessing, determining and re-configuring until the optical network is filly configured so that the optical signals have the selected power characteristics.

4. The method of claim 2, further comprising a step of repeating the steps of accessing, determining and re-configuring until the optical network is fully configured so that the optical signals have the selected power characteristics, wherein the selected power characteristics occur when the optical signals have a consistent output power per wavelength between neighboring nodes.

5. The method of claim 2, further comprising a step of repeating the steps of accessing, determining and re-configuring until the optical network is filly configured so that the optical signals have the selected power characteristics, wherein the selected power characteristics occur when the optical signals have a selected signal-to-noise ratio.

6. The method of claim 2, further comprising a step of repeating the steps of accessing, determining and re-configuring until the optical network is fully configured so that the optical signals have the selected power characteristics, wherein the selected power characteristics occur when selected signal channels of the optical signals are balanced to have selected power ratios.

7. The method of claim 2, further comprising a step of using the power parameters to adjust a selected node to compensate for power level changes that occur in the network due a change in network conditions.

8. The method of claim 2, wherein the step of accessing comprises a step of receiving the power parameters from at least one neighbor node.

9. The method of claim 8, wherein the step of receiving comprises a step of receiving the power parameters at a selected node from at least one neighbor node, wherein the power parameters includes a transmit power level parameter.

10. In an optical network comprised of a plurality of nodes having logic to receive and transmit optical signals over optical fibers, a method for managing signal power levels of the optical signals received and transmitted from a selected node, the method comprising steps of:

configuring the selected node based on configuration parameters;

receiving power parameter information describing power levels of the optical signals to be received at the selected node;

determining from the power parameter information if the optical signals to be received at the selected node have selected power characteristics; and re-configuring the selected node, when the optical signals do not have the selected power characteristics.

11. The method of claim 10, further comprising a step of repeating the steps of receiving, determining, and re-configuring until the optical signals to be received at the selected node have the selected power characteristics.

12. The method of claim 10, further comprising a step of repeating the steps of receiving, determining, and re-configuring until the optical signals to be received at the selected node have a selected signal-to-noise ratio.

13. The method of claim 10, further comprising a step of repeating the steps of receiving, determining, and re-configuring until selected signal channels of the optical signals are balanced to have selected power ratios.

14. The method of claim 10, further comprising a step of repeating the steps of receiving, determining, and re-configuring until the optical signals received at the selected node have a consistent output power per wavelength.

15. The method of claim 10, wherein the step of re-configuring comprises steps of:

re-configuring the selected node, when the optical signals do not have the selected power characteristics;

storing re-configuration information generated when the node is re-configured; and using the stored re-configuration information to adjust the selected node to compensate for power level changes that occur in the network due a change in network conditions.

16. The method of claim 10, further comprising steps of:
transmitting power parameter information describing power levels of the optical signals to be transmitted from the selected node;
determining if the optical signals to be transmitted from the selected node have selected power characteristics; and
re-configuring the selected node, when the optical signals to be transmitted do not have the selected power characteristics.

17. The method of claim 16, further comprising a step of repeating the steps of transmitting, determining, and re-configuring until the optical signals to be transmitted from the selected node have selected signal-to-noise ratios.

18. The method of claim 16, further comprising a step of repeating the steps of transmitting, determining, and re-configuring until selected signal channels of the optical signals are balanced to have selected power ratios.

19. The method of claim 16, further comprising a step of repeating the steps of transmitting, determining, and re-configuring until the optical signals transmit from the selected node have a consistent output power per wavelength.

20. The method of claim 16, wherein the step of re-configuring comprises steps of:
re-configuring the selected node, when the optical signals do not have the selected power characteristics;
storing re-configuration information generated when the node is re-configured; and
using the stored re-configuration information to adjust the selected node to compensate for power level changes that occur in the network due a change in network conditions.

21. An optical network operable to manage signal power levels of optical signals in an optical network so that the optical signals have selected power characteristics, wherein the optical network includes a plurality of nodes that receive and transmit the optical signals over optical fibers, the optical network comprising:
means for configuring one or more nodes based on configuration parameters; and
means for performing steps of:
accessing power parameters relative to one or more nodes;
determining from the accessed power parameters if the optical network is fully configured so that the optical signals have the selected power characteristics; and
re-configuring one or more nodes, when the optical signals do not have the selected power characteristics.

22. The optical network of claim 21, further comprising means for repeating the steps of accessing, determining and re-configuring until the optical network is fully configured so that the optical signals have the selected power characteristics.

23. The optical network of claim 21, further comprising means for repeating the steps of accessing, determining and re-configuring until the optical network is fully configured so that the optical signals have the selected power characteristics, wherein the selected power characteristics occur when the optical signals have a consistent output power per wavelength between neighboring nodes.

24. The optical network of claim 21, further comprising means for repeating the steps of accessing, determining and re-configuring until the optical network is fully configured so that the optical signals have the selected power characteristics, wherein the selected power characteristics occur when the optical signals have a selected signal-to-noise ratio.

25. The optical network of claim 21, further comprising means for repeating the steps of accessing, determining and re-configuring until the optical network is fully configured so that the optical signals have the selected power characteristics, wherein the selected power characteristics occur when selected signal channels of the optical signals are balanced to have selected power ratios.

26. The optical network of claim 21, further comprising means for using the power parameters to adjust a selected node to compensate for power level changes that occur in the network due a change in network conditions.

27. The optical network of claim 21, further comprising means for receiving the power parameters at a selected node from a selected neighbor node.

28. The optical network of claim 27, wherein the means for receiving comprises a step of receiving the power parameters at the selected node from at least one neighbor node, wherein the power parameters includes a transmit power level parameter.

29. A node operable to manage signal power levels of optical signals in an optical network so that the optical signals have selected power characteristics, wherein the optical network includes a plurality of nodes that receive and transmit the optical signals over optical fibers, the node comprising:
means for configuring the node based on configuration parameters; and
means for performing steps of:
receiving power parameter information describing power levels of the optical signals to be received at the node;
determining from the power parameter information if the optical signals to be received at the node have selected power characteristics; and
re-configuring the node, when the optical signals do not have the selected power characteristics.

30. The node of claim 29, further comprising means for repeating the steps of receiving, determining, and re-configuring until the optical signals to be received at the node have the selected power characteristics.

31. The node of claim 29, further comprising means for repeating the steps of receiving, determining, and re-configuring until the optical signals to be received at the node have a selected signal-to-noise ratio.

32. The node of claim 29, further comprising means for repeating the steps of receiving, determining, and reconfiguring until selected signal channels of the optical signals are balanced to have selected power ratios.

33. The node of claim 29, further comprising means for repeating the steps of receiving, determining, and re-configuring until the optical signals received at the node have a consistent output power per wavelength.

34. The node of claim 29, wherein the means for performing the step of re-configuring comprises means for performing steps of:
re-configuring the selected node, when the optical signals do not have the selected power characteristics;
storing re-configuration information generated when the node is re-configured; and
using the stored re-configuration information to adjust the selected node to compensate for power level changes that occur in the network due a change in network conditions.

35. The node of claim 29, further comprising means for performing steps of:

transmitting power parameter information describing power levels of the optical signals to be transmitted from the selected node;

determining if the optical signals to be transmitted from the selected node have selected power characteristics; and re-configuring the selected node, when the optical signals to be transmitted do not have the selected power characteristics.

36. The node of claim 35, further comprising means for repeating the steps of transmitting, determining, and re-configuring until the optical signals to be transmitted from the node have a selected signal-to-noise ratio.

37. The node of claim 35, further comprising means for repeating the steps of transmitting, determining, and re-configuring until selected signal channels of the optical signals are balanced to have selected power ratios.

38. The node of claim 35, further comprising means for repeating the steps of transmitting, determining, and re-configuring until the optical signals transmit from the node have a consistent output power per wavelength.

39. The node of claim 35, wherein the means for performing the step of re-configuring comprises means for performing steps of:

re-configuring the node, when the optical signals do not have the selected power characteristics;

storing re-configuration information generated when the node is re-configured; and using the stored re-configuration information to adjust the node to compensate for power level changes that occur in the network due a change in network conditions.

40. A network element operable to manage signal power levels of optical signals in an optical network so that the optical signals have selected power characteristics, wherein the optical network includes a plurality of nodes that receive and transmit the optical signals over optical fibers, the network element comprising:

node logic that includes an optical receiver to receive at least a first portion of the optical signals and an optical transmitter to transmit at least a second portion of the optical signals; and power management logic coupled to the node logic and comprising:

an input to receive configuration parameters to configure the network element;

a processor operable to perform steps of:

receiving power parameter information describing power levels of the first portion of the optical signals to be received at the optical receiver;

determining from the power parameter information if the first portion of the optical signals to be received at the optical receiver have selected power characteristics; and re-configuring the node logic, when the optical signals do not have the selected power characteristics.

41. The network element of claim 40, wherein the selected power characteristics occur when the optical signals have a consistent output power per wavelength.

42. The network element of claim 40, wherein the selected power characteristics occur when the optical signals have selected signal-to-noise ratios.

43. The network element of claim 40, wherein the selected power characteristics occur when selected signal channels of the optical signals are balanced to have selected power ratios.

44. The network element of claim 40, wherein the processor is further operable to transmit a request to a second network element to adjust power levels of the optical signals transmitted from the second network element.

45. The network element of claim 40, wherein the processor is further operable to perform steps of:

receiving a request to adjust power levels of the optical signals transmitted from the network element; and adjusting the power levels of the optical signals transmitted from the network element in response to the request.

* * * * *